(12) United States Patent
Kobayashi et al.

(10) Patent No.: US 11,400,632 B2
(45) Date of Patent: Aug. 2, 2022

(54) EXTRUDER SCREW WITH CONVEYING PORTIONS AND BARRIER PORTIONS AND EXTRUSION METHODS USING THE EXTRUDER SCREW AND A PLURALITY OF BARREL BLOCKS

(71) Applicants: Toshiba Kikai Kabushiki Kaisha, Tokyo (JP); HSP Technologies Inc., Tsukuba (JP)

(72) Inventors: Akiyoshi Kobayashi, Fuji (JP); Shigeyuki Fujii, Numazu (JP); Hiroshi Shimizu, Tsukuba (JP)

(73) Assignees: Toshiba Kikai Kabushiki Kaisha, Tokyo (JP); HSP Technologies Inc., Tsukuba (JP)

( * ) Notice: Subject to any disclaimer, the term of this patent is extended or adjusted under 35 U.S.C. 154(b) by 957 days.

(21) Appl. No.: 15/497,961

(22) Filed: Apr. 26, 2017

(65) Prior Publication Data

US 2017/0225360 A1   Aug. 10, 2017

Related U.S. Application Data

(63) Continuation of application No. PCT/JP2015/080022, filed on Oct. 23, 2015.

(30) Foreign Application Priority Data

Oct. 27, 2014   (JP) .............................. JP2014-218709

(51) Int. Cl.
*B29C 48/51*       (2019.01)
*B29C 48/67*       (2019.01)
(Continued)

(52) U.S. Cl.
CPC ................ *B29C 48/51* (2019.02); *B29B 7/42* (2013.01); *B29B 7/426* (2013.01); *B29B 7/429* (2013.01);
(Continued)

(58) Field of Classification Search
CPC ........... B29B 7/489; B29B 7/847; B29B 7/82; B29B 7/90; B29B 7/845; B29B 7/42;
(Continued)

(56) References Cited

U.S. PATENT DOCUMENTS 3,371,379 A * 3/1968 Reifenhauser ........ B29C 48/766
96/196
3,503,944 A * 3/1970 Heinrich ................. B29C 48/72
526/88

(Continued)

FOREIGN PATENT DOCUMENTS

CN        1137970       12/1996
CN        101973121      2/2011
(Continued)

OTHER PUBLICATIONS

English Language Abstract and Translation of JP 2011-000881 published Jan. 6, 2011.
(Continued)

*Primary Examiner* — Charles Cooley
(74) *Attorney, Agent, or Firm* — DLA Piper LLP US

(57) ABSTRACT

An extruder includes a screw for extruder provided with a screw element for kneading a raw material, and a barrel including a cylinder portion in which the screw is inserted so as to be rotatable. A plurality of screw elements identical with the screw element are provided in a longitudinal direction of the screw under a certain rule. The barrel is integrated by combining a plurality of barrel blocks blocked. Each of the plurality of barrel blocks is configured in accordance with a length of the screw element provided in the longitudinal direction of the screw.

2 Claims, 22 Drawing Sheets

(51) Int. Cl.
       B29C 48/76      (2019.01)
       B29B 7/48       (2006.01)
       B29B 7/84       (2006.01)
       B29B 7/42       (2006.01)
       B29B 7/72       (2006.01)
       B29B 7/74       (2006.01)
       B29B 7/82       (2006.01)
       B29C 48/385     (2019.01)
       B29C 48/55      (2019.01)
       B29C 48/54      (2019.01)
       B29C 48/25      (2019.01)
       B29C 48/57      (2019.01)
       B29C 48/09      (2019.01)
       B29C 48/40      (2019.01)
       B29C 48/80      (2019.01)
       B29C 48/53      (2019.01)
       B29K 33/00      (2006.01)
       B29K 69/00      (2006.01)
(52) U.S. Cl.
       CPC ............ B29B 7/483 (2013.01); B29B 7/489 (2013.01); B29B 7/726 (2013.01); B29B 7/7461 (2013.01); B29B 7/823 (2013.01); B29B 7/84 (2013.01); B29B 7/845 (2013.01); B29C 48/385 (2019.02); B29C 48/67 (2019.02); B29C 48/76 (2019.02); B29C 48/09 (2019.02); B29C 48/252 (2019.02); B29C 48/268 (2019.02); B29C 48/402 (2019.02); B29C 48/53 (2019.02); B29C 48/54 (2019.02); B29C 48/55 (2019.02); B29C 48/57 (2019.02); B29C 48/767 (2019.02); B29C 48/832 (2019.02); B29C 48/834 (2019.02); B29K 2033/12 (2013.01); B29K 2069/00 (2013.01)
(58) Field of Classification Search
       CPC ....... B29B 7/421; B29B 7/823; B29B 7/7485; B29B 7/7461; B29B 7/429; B29B 7/482; B29B 7/422; B29B 7/726; B29B 7/483; B29C 47/402; B29C 47/6018; B29C 47/622; B29C 47/6056; B29C 47/6012; B29C 48/82; B29C 48/802; B29C 48/625; B29C 48/385; B29C 48/535; B29C 48/55; B29C 48/54; B29C 48/72; B29C 48/402; B29C 48/74; B29C 48/745; B29C 48/725; B29C 48/51; B29C 48/515; B29C 48/2564; B29C 48/507; B29C 48/53; B29C 48/575; B29C 48/57; B29C 48/25682; B29C 48/268; B29C 48/67; B29C 48/68; B29C 4/62; B29C 48/2565; B29K 2105/251; B29K 2023/12; B29K 2509/00; B29K 2101/12; B01F 7/00416; B01F 15/06; B01F 2015/061; B01F 2215/0049
       USPC ............... 425/200–209; 366/79–91
       See application file for complete search history.

(56) References Cited

U.S. PATENT DOCUMENTS

| | | | | | |
|---|---|---|---|---|---|
| 3,704,972 | A | * | 12/1972 | Kneller | B29C 48/92 425/145 |
| 3,712,594 | A | * | 1/1973 | Schippers | B29C 48/505 366/75 |
| 3,746,318 | A | * | 7/1973 | Schippers | B29B 7/42 366/79 |
| 3,924,842 | A | * | 12/1975 | Klein | B29C 48/395 366/79 |
| 3,999,921 | A | * | 12/1976 | Thor | B29B 7/42 425/208 |
| 4,290,702 | A | * | 9/1981 | Klein | B29C 45/50 366/77 |
| 4,387,997 | A | * | 6/1983 | Klein | B29C 45/50 366/79 |
| 4,423,960 | A | * | 1/1984 | Anders | B29C 48/395 366/75 |
| 4,472,059 | A | * | 9/1984 | Klein | B29C 48/51 366/79 |
| 4,637,790 | A | * | 1/1987 | Klein | B29C 48/51 425/208 |
| 4,802,140 | A | * | 1/1989 | Dowling | B29B 7/42 366/79 |
| 4,938,127 | A | * | 7/1990 | van Lengerich | A21B 7/00 99/353 |
| 5,056,925 | A | | 10/1991 | Klein | |
| 5,456,870 | A | * | 10/1995 | Bulgrin | B29C 45/76 264/211.21 |
| 5,804,111 | A | * | 9/1998 | Kobayashi | B29C 48/38 264/40.5 |
| 9,199,393 | B2 | * | 12/2015 | Shimizu | B29B 7/728 |
| 10,967,554 | B2 | * | 4/2021 | Kobayashi | B29C 48/51 |
| 11,072,104 | B2 | * | 7/2021 | Kobayashi | B29C 48/51 |
| 11,110,638 | B2 | * | 9/2021 | Kobayashi | B29C 48/2511 |
| 11,220,022 | B2 | * | 1/2022 | Kobayashi | B29C 48/535 |
| 11,224,991 | B2 | * | 1/2022 | Kobayashi | B29C 48/535 |
| 11,229,889 | B2 | * | 1/2022 | Kobayashi | B29B 7/42 |
| 11,230,033 | B2 | * | 1/2022 | Kobayashi | B29B 7/726 |
| 2005/0087904 | A1 | | 4/2005 | Bryan | |
| 2011/0042841 | A1 | * | 2/2011 | Wildi | B29B 9/12 264/13 |
| 2016/0332331 | A1 | * | 11/2016 | Kobayashi | B29B 7/483 |
| 2016/0332332 | A1 | * | 11/2016 | Kobayashi | B29C 48/54 |
| 2017/0021547 | A1 | * | 1/2017 | Kobayashi | B29B 7/82 |
| 2017/0050366 | A1 | * | 2/2017 | Kobayashi | B29B 7/82 |
| 2017/0050367 | A1 | * | 2/2017 | Kobayashi | B29C 48/67 |
| 2017/0113394 | A1 | * | 4/2017 | Kobayashi | B29B 7/429 |
| 2017/0225360 | A1 | * | 8/2017 | Kobayashi | B29B 7/823 |
| 2017/0225379 | A1 | * | 8/2017 | Kobayashi | B29B 7/487 |
| 2018/0093233 | A1 | * | 4/2018 | Kobayashi | B01F 15/06 |
| 2018/0093234 | A1 | * | 4/2018 | Kobayashi | B29B 7/421 |
| 2019/0202086 | A1 | * | 7/2019 | Oishi | B30B 11/243 |
| 2019/0352472 | A1 | * | 11/2019 | Sameshima | B29C 48/16 |
| 2021/0154906 | A1 | * | 5/2021 | Kobayashi | B29C 48/51 |
| 2021/0316492 | A1 | * | 10/2021 | Kobayashi | B29C 48/385 |
| 2021/0362374 | A1 | * | 11/2021 | Sameshima | C08L 23/10 |

FOREIGN PATENT DOCUMENTS

| | | | | |
|---|---|---|---|---|
| CN | 103347677 | | 10/2013 | |
| DE | 2454785 | * | 5/1976 | |
| DE | 27 58 265 | | 6/1979 | |
| EP | 3650196 | A1 * | 5/2020 | |
| JP | S48-61153 | | 8/1973 | |
| JP | S50-143863 | | 11/1975 | |
| JP | S52-72573 | | 5/1977 | |
| JP | H5-29729 | | 4/1993 | |
| JP | H07-266404 | | 10/1995 | |
| JP | H09-131727 | | 5/1997 | |
| JP | 2008-302555 | | 12/2008 | |
| JP | 2011-000811 | | 1/2011 | |
| JP | 2011-000881 | | 1/2011 | |
| JP | 2011-116025 | | 6/2011 | |
| JP | 2013-71428 | | 4/2013 | |
| JP | 2014-19045 | | 2/2014 | |
| SU | 889462 | A2 * | 12/1981 | ............ B29C 48/51 |
| WO | WO 2010/061872 | | 6/2010 | |
| WO | WO 2010/134208 | | 11/2010 | |
| WO | WO 2012/086192 | | 6/2012 | |
| WO | WO-2013133453 | A1 * | 9/2013 | ............ B29C 48/64 |
| WO | WO-2020025446 | A1 * | 2/2020 | ............ B33Y 40/10 |

OTHER PUBLICATIONS

Taiwan Office Action (with English Translation) issued in TW 104135237 dated Aug. 5, 2016.

(56) References Cited

OTHER PUBLICATIONS

International Search Report (with English Translation) issued in PCT/JP2015/080022 dated Jan. 19, 2016.
Written Opinion (with English Translation) issued in PCT/JP2015/080022 dated Jan. 19, 2016.
English Language Abstract and Translation of JP 2011-000811 published Jan. 6, 2011.
English Language Abstract and Translation of JP 2008-302555 published Dec. 18, 2008.
English Language Abstract and Translation of Jp S50-143863 published Nov. 19, 1975.
Eng ish Language Abstract and Translation of JP 2011-116025 published June 16, 2011
English Language Translation of JP S48-61153 published Aug. 3, 1973.
English Language Abstract and Translation of JP H07-266404 published Oct. 17, 1995.
English Language Abstract and Translation of JP H09-131727 published May 20, 1997.
Korean Office Action dated Dec. 6, 2018 in Application No. 10-2017-7014524.
Chinese Office Action (with English Translation) issued in CN 201580058334.7 dated Sep. 30, 2018.
German Office Action in Application No. 11 2015 004 870.17, dated Nov. 15, 2021.

* cited by examiner

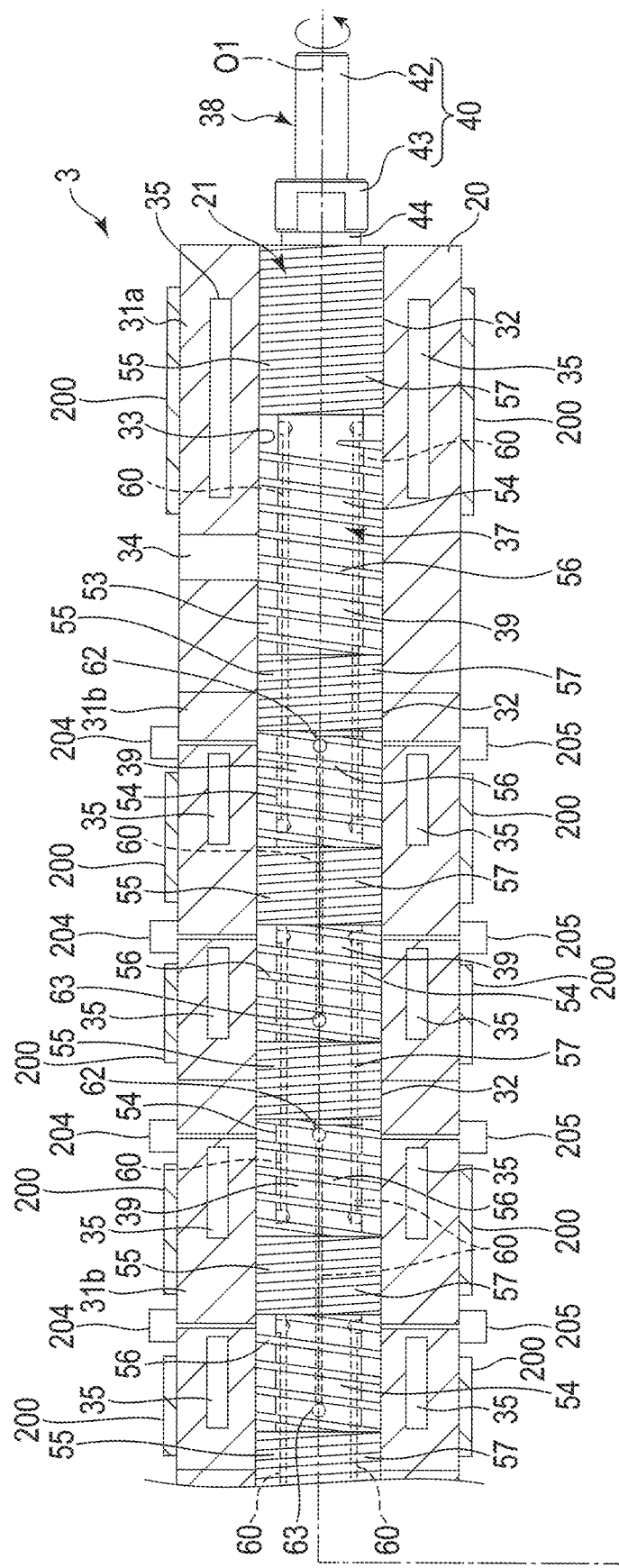
F I G. 5

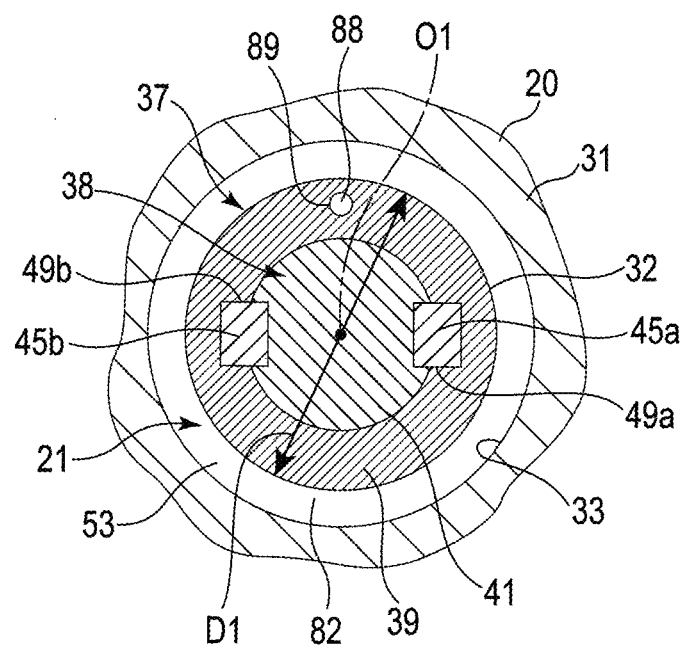
F I G. 14
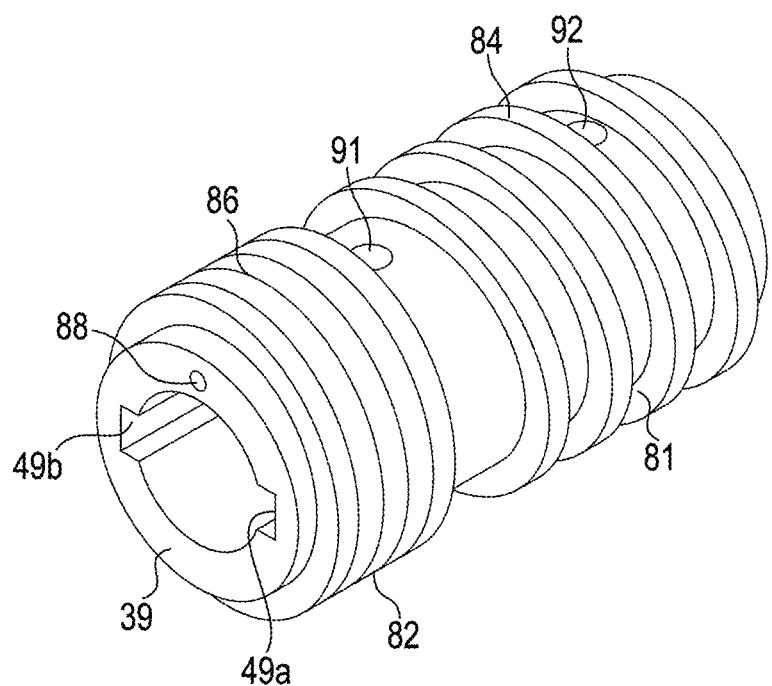
F I G. 15

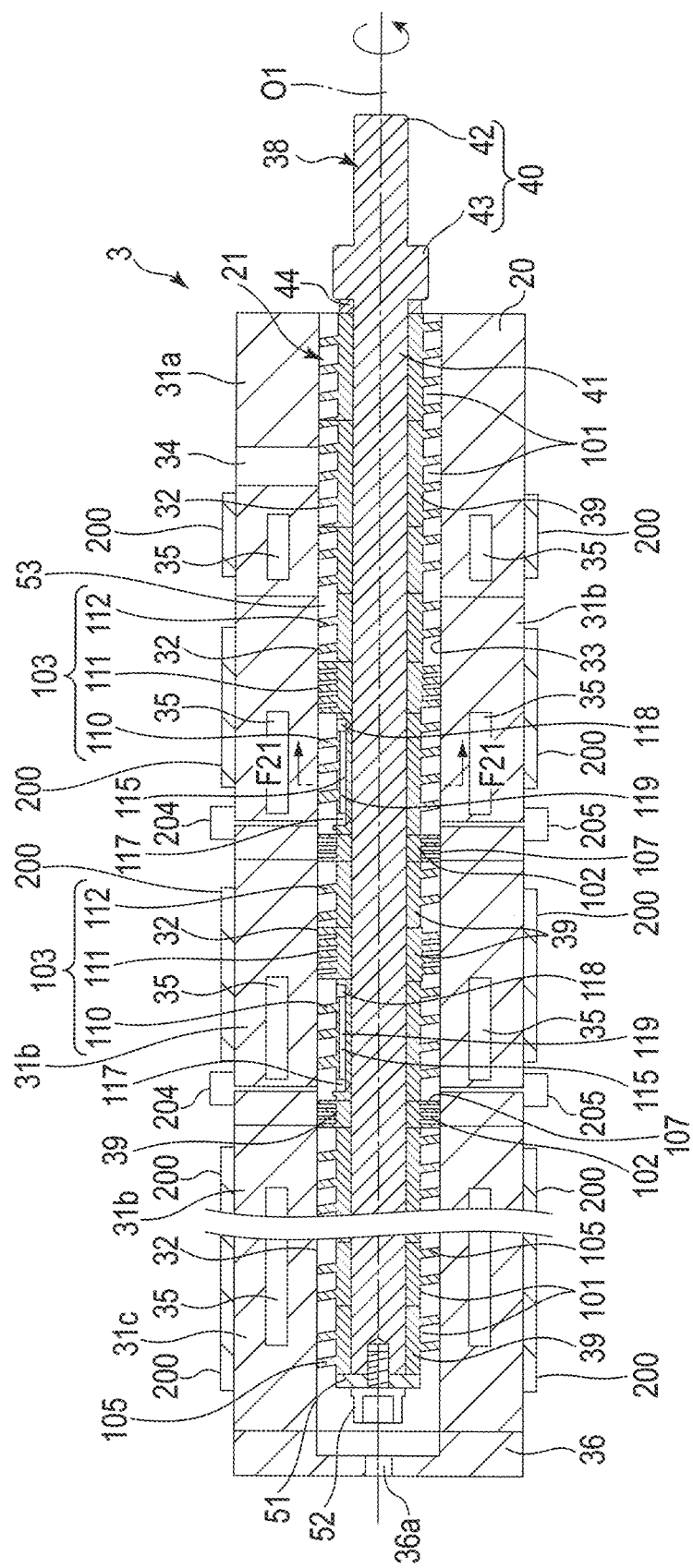
F I G. 19

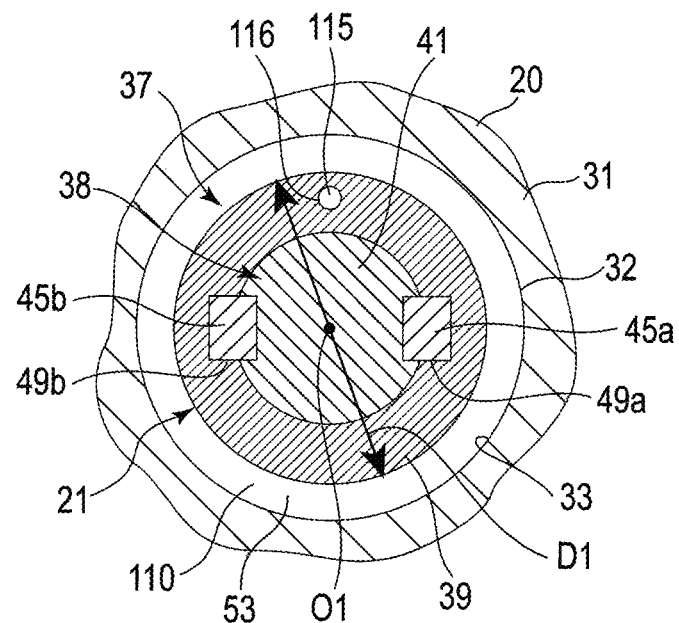
F I G. 21
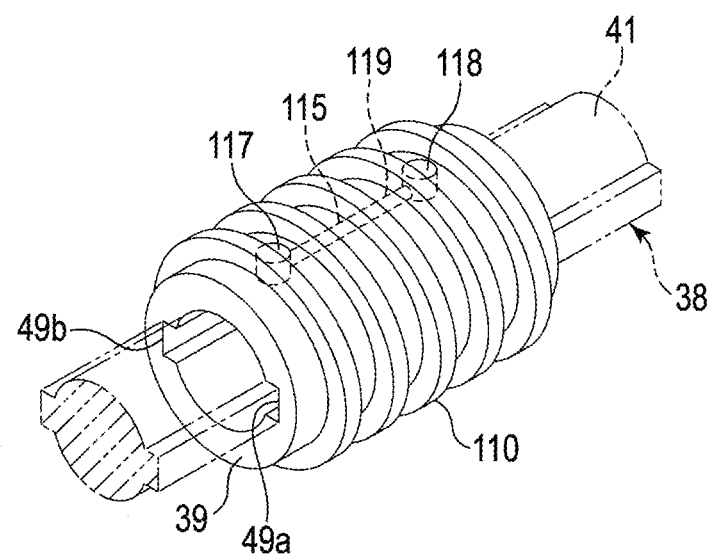
F I G. 22

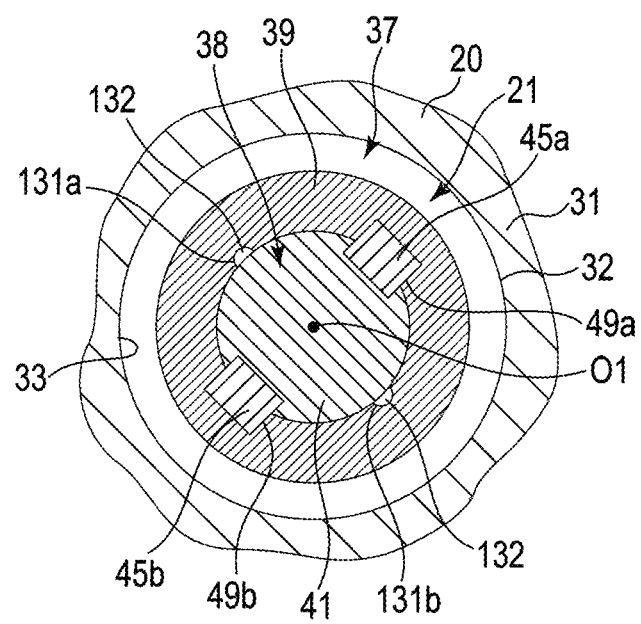
F I G. 28
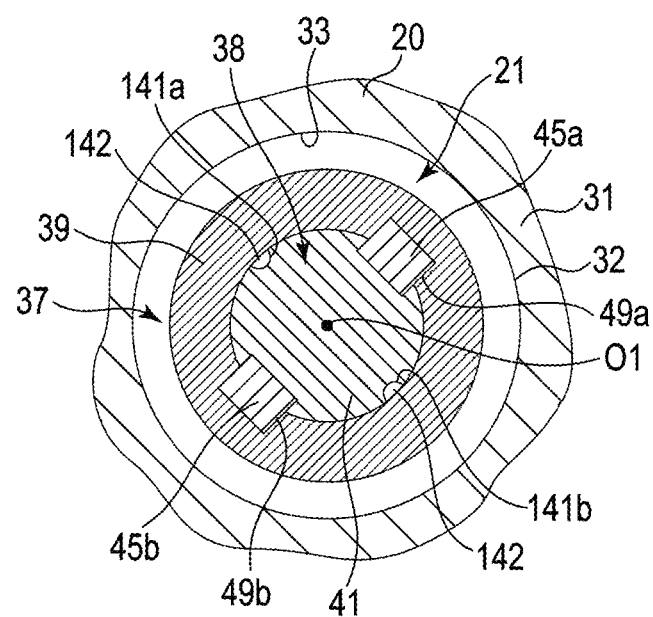
F I G. 29

EXTRUDER SCREW WITH CONVEYING PORTIONS AND BARRIER PORTIONS AND EXTRUSION METHODS USING THE EXTRUDER SCREW AND A PLURALITY OF BARREL BLOCKS

CROSS REFERENCE TO RELATED APPLICATIONS

This application is a Continuation Application of PCT Application No. PCT/JP2015/080022, filed Oct. 23, 2015 and based upon and claiming the benefit of priority from prior Japanese Patent Application No. 2014-218709, filed Oct. 27, 2014, the entire contents of all of which are incorporated herein by reference.

BACKGROUND OF THE INVENTION

1. Field of the Invention

The present invention relates to an extruder and a kneading device comprising a barrel in which a screw is inserted so as to be rotatable. The present invention particularly relates to a barrel which can easily be modified in accordance with alignment of screw elements when screw elements for kneading a raw material are aligned regularly in an axial direction of a screw.

2. Description of the Related Art

As a technique of kneading raw materials, Patent Literature 1 discloses a batch kneading device capable of dispersing raw materials at a nanolevel and kneading them without using additives. The batch kneading device comprises a feedback-type screw and a cylindrical body in which the screw is inserted so as to be rotatable. In the kneading device, a circulation process of feeding a raw material fed into the cylinder portion from a rear end to a gap of a tip end of the screw and then returning the raw material from the gap to the rear end of the screw is repeated.

In the circulation processing, the "shearing action" resulting from the speed difference between the rotating screw and the inner surface of the cylinder portion is imparted to the raw material, while the raw material is fed from the rear end to the front end of the screw, and "extension action" occurring when the raw material passes through a narrow portion from a wide portion is imparted to the raw material while the raw material is fed through the hole of the screw from the gap of the screw tip.

At this time, the raw material is repeatedly subjected to the shearing flow and an extension flow, inside the cylinder portion. A predetermined kneaded material is produced in accordance with a time in which the shearing flow and the extension flow are repeated, i.e., a circulation time.

CITATION LIST

Patent Literature

Patent Literature 1
PCT International Publication No. WO2010/061872

BRIEF SUMMARY OF THE INVENTION

Technical Problem

Incidentally, in the apparatus of Patent Literature 1, the next kneading can be executed only after a particular amount of the raw material is circulated and kneaded in the cylinder portion and the kneaded material is entirely discharged from the cylinder portion. In other words, the kneaded material cannot be discharged from the cylinder portion while the raw material is circulated in an enclosed space inside the cylinder portion. For this reason, there has been a certain limit on improvement in the productivity of the kneaded material.

As the measure to improve the productivity of the kneaded material, a plurality of the screw elements for kneading the raw material (for example, the portion to impart a shearing action and the portion to impart an extension action) may be arranged in the axial direction of the screw.

In this method, the number of times of repeatedly imparting the shearing action and the extension action is determined in the relationship with the length (screw length) in the axial direction of the screw if the number of revolutions of the screw is set to be constant. For example, if the number of times of impartment is increased the screw length is increased in accordance with the increase and, conversely, if the number of times of impartment is decreased the screw length is decreased in accordance with the decrease.

In this case, if the screw length is varied by increasing or decreasing the number of times of impartment, the length of the barrel needs to be varied in accordance with the variation in screw length.

However, the existing barrel is integrated by combining, for example, barrel elements of the same size formed under constant standards with each other. For this reason, no problems occur if the length of the cylinder portion obtained after combining the barrel elements matches the length of the screw obtained after varying the "screw length" but, if not so, troublesome work such as minor adjustment of the length of the screw in accordance with the length of the cylinder portion is necessary.

Then, development of the barrel in which if the number of times of impartment is increased or decreased and the "screw length" is varied, the barrel structure can easily be modified to match the variation in the "screw length", has been required.

The present invention has been achieved in response to this requirement, and its object is to provide an extruder and a kneading device comprising a barrel which can easily be modified in accordance with alignment of screw elements when screw elements for kneading a raw material are aligned regularly in an axial direction of a screw.

Solution to Problem

To achieve this object, the extruder of the present invention comprises a screw for extruder provided with a screw element for kneading a raw material, and a barrel comprising a cylinder portion in which the screw is inserted so as to be rotatable. A plurality of screw elements identical with the screw element are provided in a longitudinal direction of the screw under a certain rule. The barrel is integrated by combining a plurality of barrel blocks blocked. Each of the plurality of barrel blocks is configured in accordance with a length of the screw element provided in the longitudinal direction of the screw.

The kneading device of the present invention comprises the above-explained extruder, and a processor which feeds a raw material to the extruder. The screw for extruder has a straight axis along a direction of conveying the raw material and comprises a screw body rotating about the axis. The kneading device comprises, as the screw element, a conveying portion which conveys the raw material in an axial direction along an outer peripheral surface extending in a circumferential direction of the screw body, in accordance with rotation of the screw body, and a passage provided inside the screw body, into which the raw material conveyed by the conveying portion flows and in which the raw material flows in an axial direction of the screw body.

Advantageous Effects of Invention

The present invention can achieve an extruder and a kneading device comprising a barrel which can easily be modified in accordance with alignment of screw elements when screw elements for kneading a raw material are aligned regularly in an axial direction of a screw.

BRIEF DESCRIPTION OF THE SEVERAL VIEWS OF THE DRAWING

FIG. 5 is a cross-sectional view showing a second extruder used in the first embodiment.

FIG. 14 is a cross-sectional view seen along line F14-F14 in FIG. 13.

FIG. 15 is a perspective view showing a tubular body used in the second embodiment.

FIG. 19 is a cross-sectional view showing the second extruder of the third embodiment, illustrating cross-sections of a barrel and a screw.

FIG. 21 is a cross-sectional view seen along line F21-F21 in FIG. 20.

FIG. 22 is a perspective view showing a tubular body used in the third embodiment.

FIG. 28 is a cross-sectional view showing a second extruder according to a fifth embodiment.

FIG. 29 is a cross-sectional view showing a second extruder according to a sixth embodiment.

DETAILED DESCRIPTION OF THE INVENTION

First Embodiment

A first embodiment will be described with reference to FIG. 1 to FIG. 11.

Figure 1:
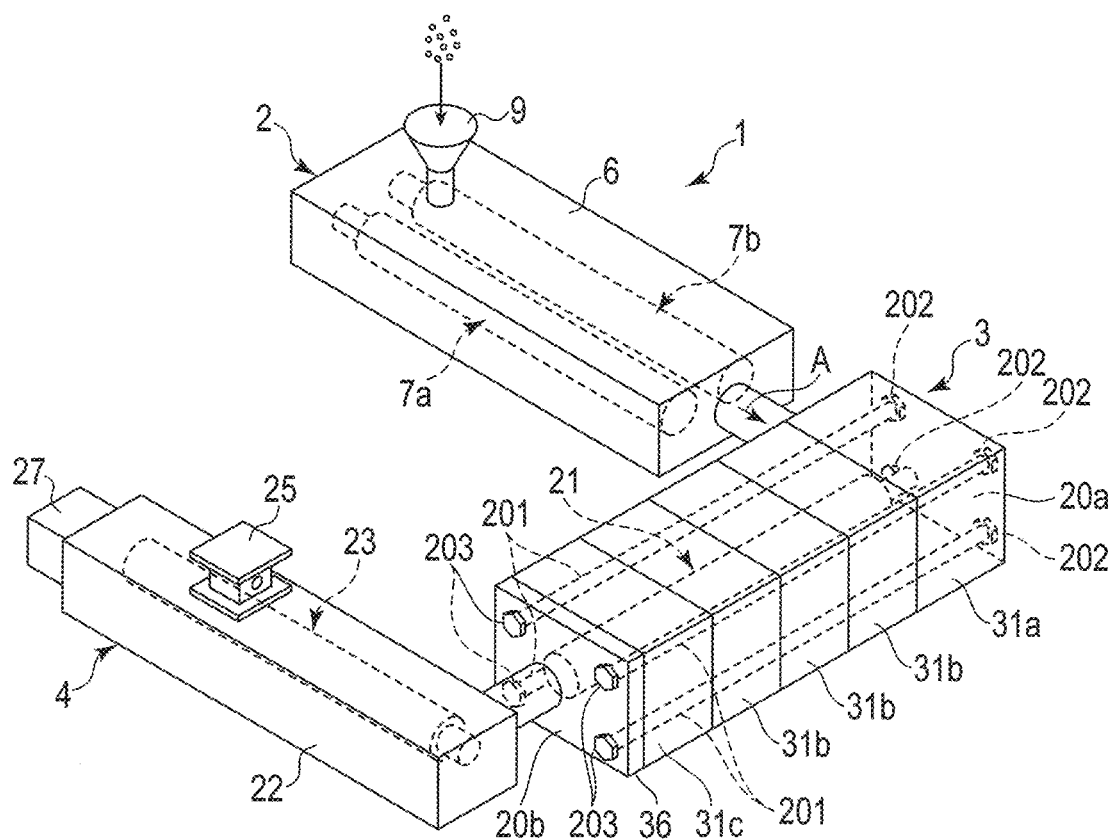
FIG. 1 is a schematic perspective view showing a continuous high shear processing apparatus (kneading apparatus) according to a first embodiment.

FIG. 1 schematically shows a structure of a continuous high shear processing apparatus (kneading machine) 1 of the first embodiment. The high shear processing apparatus 1 comprises a first extruder (processor) 2, a second extruder 3 and a third extruder (defoamer) 4. The first extruder 2, the second extruder 3 and the third extruder 4 are connected in series with each other.

The first extruder 2 is a processor for preliminarily kneading and melting, for example, materials of two types of incompatible resin or the like. As two types of resins, polycarbonate resin (PC) and polymethyl methacrylate resin (PMMA) are used. These resins are supplied to the first extruder 2 in, for example, a pellet state.

Figure 2:
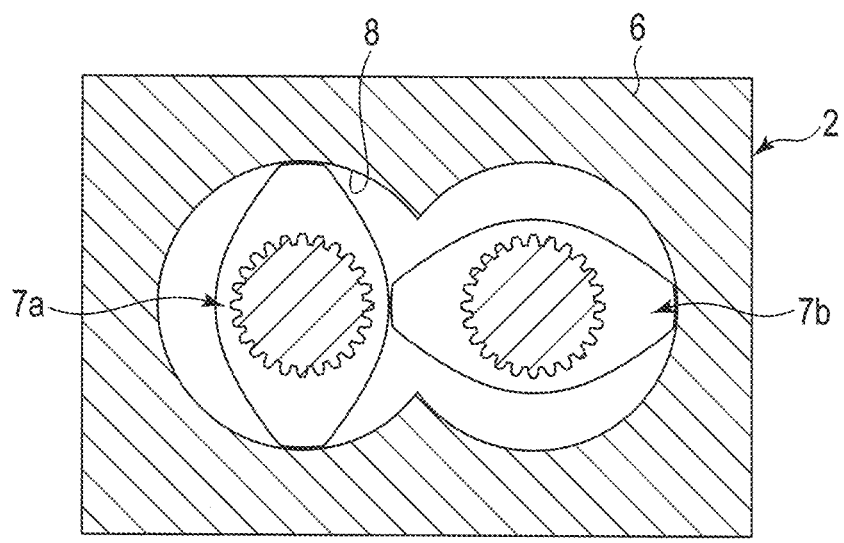
FIG. 2 is a cross-sectional view showing a first extruder used in the first embodiment.
Figure 3:
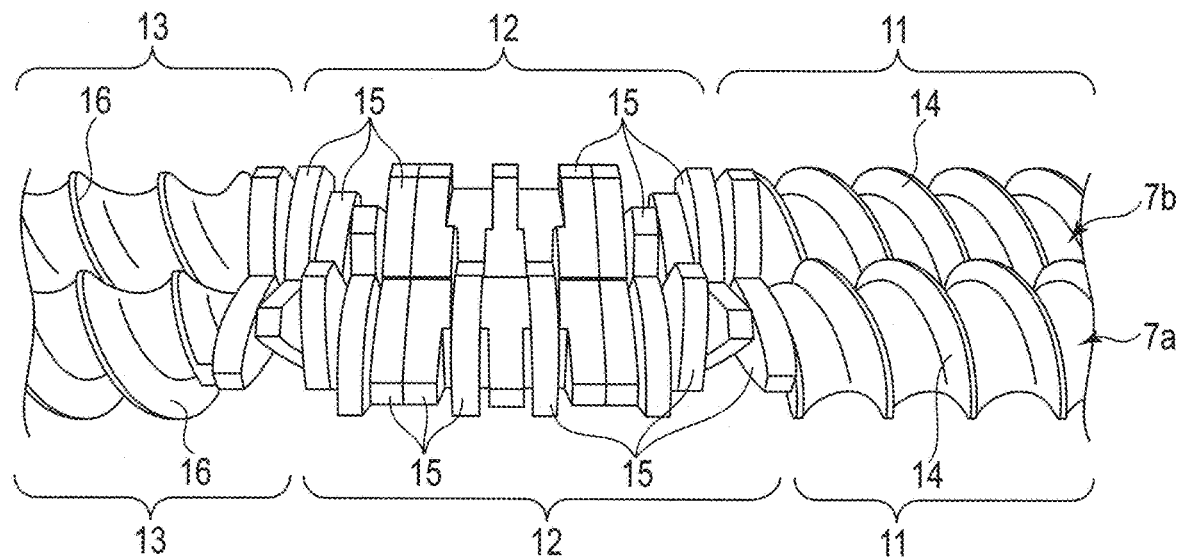
FIG. 3 is a perspective view showing a state in which two screws of the first extruder are engaged with each other in the first embodiment.

In the present embodiment, a co-rotating twin-screw kneader is used as the first extruder 2 to enhance the degree of kneading and melting the resins. FIG. 2 and FIG. 3 show an example of a twin-screw kneader. The twin-screw kneader comprises a barrel 6, and two screws 7a and 7b accommodated in the barrel 6. The barrel 6 includes a cylinder portion 8 having a shape obtained by combining two cylinders. The above-mentioned resin is continuously fed to the cylinder portion 8 through a feed port 9 provided at one end portion of the barrel 6. Furthermore, the barrel 6 is provided with a heater to melt the resin.

The screws 7a and 7b are accommodated in the cylinder portion 8 in a state of being engaged with each other. The screws 7a and 7b are rotated in the same direction upon receiving a torque transmitted from a motor (not shown). As shown in FIG. 3, each of the screws 7a and 7b is provided with a feed portion 11, a kneading portion 12 and a pumping portion 13. The feed portion 11, the kneading portion 12 and the pumping portion 13 are aligned in an axial direction of the screws 7a and 7b.

The feed portion 11 comprises a helically twisted flight 14. The flights 14 of the screws 7a and 7b are rotated while engaged with each other and convey two types of resin fed from the feed port 9 toward the kneading portions 12.

The kneading portion 12 comprises a plurality of disks 15 arranged in the axial direction of the screws 7a and 7b. The disks 15 of the screws 7a and 7b are rotated while facing each other, and preliminarily knead the resin fed from the feed portions 11. The kneaded resin is fed to the pumping portions 13 by the rotation of the screws 7a and 7b.

The pumping portion 13 comprises a helically twisted flight 16. The flights 16 of the screws 7a and 7b are rotated while engaged with each other, and push out the preliminary kneaded resin from a discharge end of the barrel 6.

According to such a twin-screw kneader, the resin fed to the feed portions 11 of the screws 7a and 7b is melt upon receiving the shear heat generation associated with the rotation of the screws 7a and 7b and the heat from the heater. The resin molten by the preliminary kneading in the twin-screw kneader constitutes a blended raw material. The raw material is continuously fed to the second extruder 3 through the discharge end of the barrel 6 as indicated by arrow A in FIG. 1.

Furthermore, not only the resin can be molten, but a shearing action can be imparted to the resin by constituting the first extruder 2 as a twin-screw kneader. For this reason, when the raw material is fed to the second extruder 3, the raw material is molten by preliminary kneading in the first extruder 2 and maintained at an optimum viscosity. In addition, when the raw material is continuously fed to the second extruder 3, a predetermined amount per unit time of the raw material can be stably fed by constituting the first extruder 2 as a twin-screw kneader. Load on the second extruder 3 which completely kneads the raw material can be therefore reduced.

The second extruder 3 is an element for producing a kneaded material having a microscopic dispersion structure in which polymeric components of the raw material are nano-dispersed. In the present embodiment, a single-screw extruder is used as the second extruder 3. The single-screw extruder comprises a barrel 20 and a screw 21 for extruder (hereinafter referred to as a screw 21). The screw 21 has a function of repeatedly imparting the shearing action and extension action to the melted raw material. The structure of the second extruder 3 comprising the screw 21 will be described in detail later.

Figure 4:
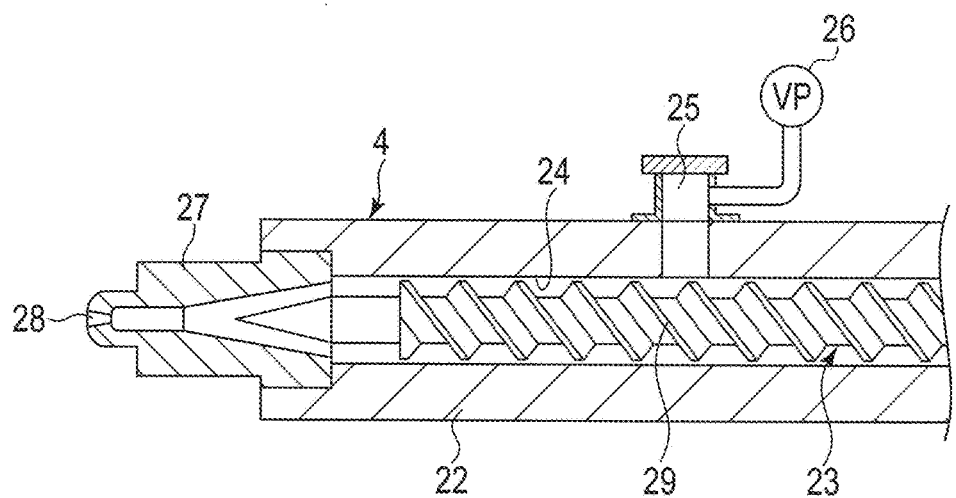
FIG. 4 is a cross-sectional view showing a third extruder used in the first embodiment.

The third extruder 4 is an element for sucking and removing the gas components contained in the kneaded material discharged from the second extruder 3. In the present embodiment, a single-screw extruder is used as the third extruder 4. As shown in FIG. 4, the single-screw extruder comprises a barrel 22 and a vent screw 23 accommodated in the barrel 22. The barrel 22 includes a cylinder portion 24 shaped in a straight cylinder. The kneaded material pushed out from the second extruder 3 is continuously fed into the cylinder portion 24 through an axial end portion of the cylinder portion 24.

The barrel 22 has a vent port 25. The vent port 25 is opened to an axial middle portion of the cylinder portion 24 and is connected to a vacuum pump 26. Furthermore, the other end portion of the cylinder portion 24 of the barrel 22 is closed by a head portion 27. The head portion 27 comprises a discharge port 28 through which the kneaded material is discharged.

The vent screw 23 is accommodated in the cylinder portion 24. The vent screw 23 is rotated in one direction upon receiving torque transmitted from a motor (not shown).

The vent screw 23 comprises a helically twisted flight 29. The flight 29 is rotated integrally with the vent screw 23 and continuously conveys the kneaded material fed to the cylinder portion 24 to the head portion 27. When the kneaded material is conveyed to a position corresponding to the vent port 25, the kneaded material receives the vacuum pressure of the vacuum pump 26. That is, gaseous substances and other volatile components contained in the kneaded material are continuously sucked and removed from the kneaded material by pulling the inside of the cylinder portion 24 at a negative pressure by a vacuum pump. The kneaded material from which the gaseous substances and other volatile substances have been removed is continuously discharged to the outside of the high shear processing apparatus 1 through the discharge port 28 of the head portion 27.

Next, the second extruder 3 will be described in detail.

Figure 6:
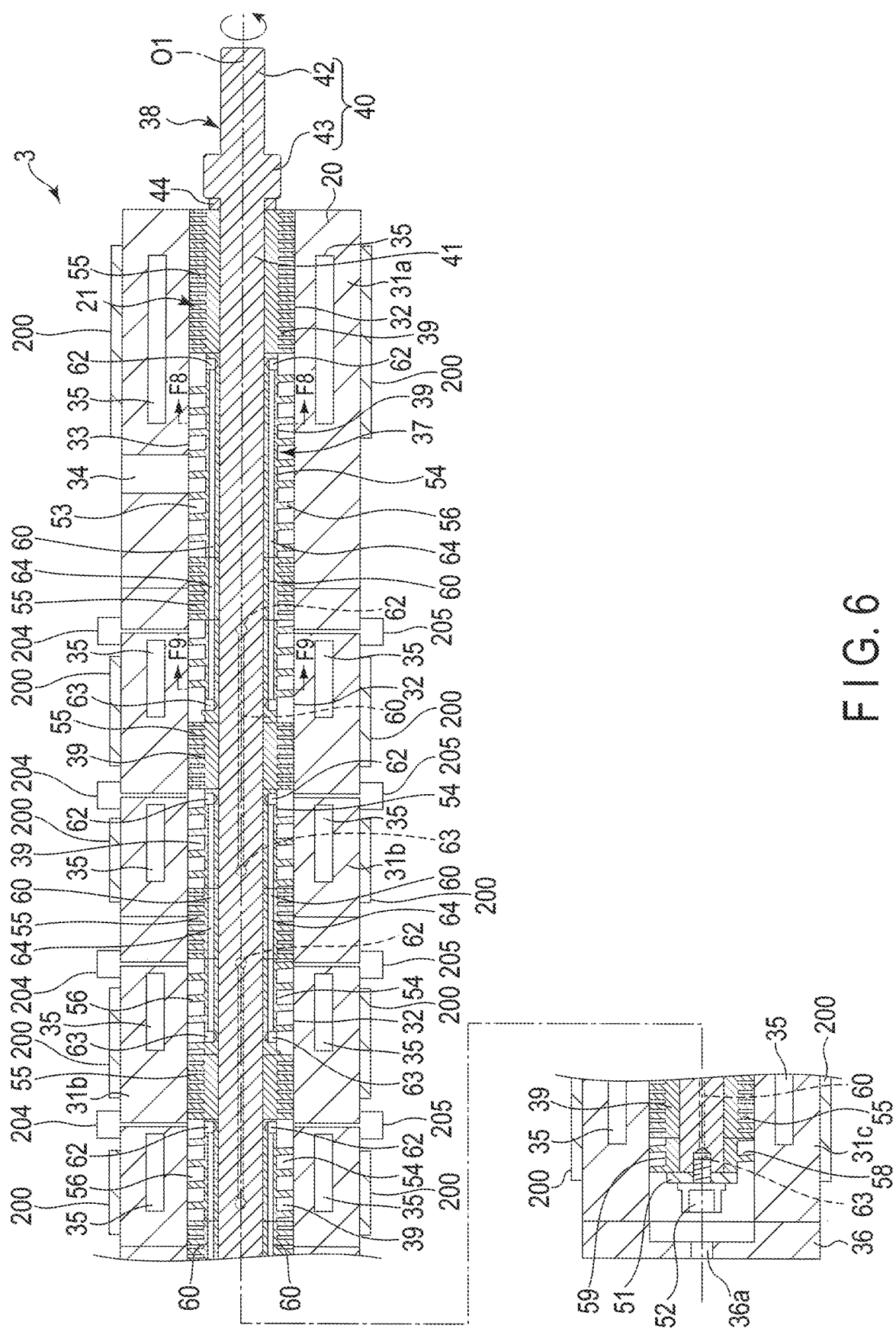
FIG. 6 is a cross-sectional view showing the second extruder of the first embodiment, illustrating cross-sections of a barrel and a screw.

As shown in FIG. 1, FIG. 5 and FIG. 6, the barrel 20 of the second extruder 3 is shaped in a straight cylinder and is disposed horizontally. The barrel 20 is integrated by combining a plurality of barrel blocks 31a, 31b and 31c which are formed as blocks, with each other. Three barrel blocks 31b are shown in FIG. 1 but this is merely an example and, it is needless to say that the number of barrel blocks 31b can be increased or decreased in accordance with, for example, the length of the screw 21 varied according to the number of "screw elements", which will be explained later.

Each of the barrel blocks 31a, 31b, and 31c includes a cylindrical through hole 32. Each barrel blocks 31a, 31b and 31c are combined integrally such that their through-holes 32 are coaxially continuous. The through holes 32 of the respective barrel blocks 31a, 31b and 31c cooperate with each other to define a cylinder portion 33 in a cylindrical shape inside the barrel 20. The cylinder portion 33 extends in the axial direction of the barrel 20.

A feed port 34 is formed on the barrel block 31a at an axial end portion of the barrel 20. The feed port 34 communicates with the cylinder portion 33, and the raw material blended by the first extruder 2 is continuously fed to the feed port 34.

A heater 200 is provided on each of the barrel blocks 31a, 31b and 31c. The heaters 200 are disposed along outer surfaces of the respective barrel blocks 31a, 31b and 31c to cover the cylinder portion 33. Each of the heaters 200 adjusts the temperature of the barrel 20 such that the temperature of the barrel 20 becomes an optimal temperature for kneading the raw material. Furthermore, each of the barrel blocks 31a, 31b and the 31c is provided with a refrigerant passage 35 through which a refrigerant such as water or oil flows. The refrigerant passage 35 is disposed so as to surround the cylinder portion 33. The refrigerant flows along the refrigerant passage 35 to forcibly cool the barrel 20 when the temperature of the barrel 20 exceeds a predetermined upper limit.

The barrel block 31c at the axial other end portion of the barrel 20 is closed by a head portion 36. The head portion 36 includes a discharge port 36a. The discharge port 36a is positioned on a side of the barrel 20 axially opposite to the feed port 34 and is connected to the third extruder 4.

In such a barrel 20, through holes (not shown) are formed in an axial direction at four corners of each of the barrel blocks 31a, 31b ad 31c and the head portion 36 such that, for example, connecting rods 201 such as tie bars or tie rods can be inserted into the through holes (see FIG. 1). The barrel blocks 31a, 31b and 31c and the head portion 36 can be integrated with each other by inserting the connecting rods 201 through the through holes at four corners and tightening both ends of the connecting rods 201 with nuts 202 and 203 in a state in which each of the barrel blocks 31a, 31b and 31c and the head portion 36 are juxtaposed in the axial direction.

In this case, the nuts 202 on one side are buried in an outer end surface 20a of the barrel block 31a (barrel 20) to disable the rotation, and the nuts 203 on the other side are provided on an outer end face 20b of the head portion 36 (barrel 20) to be rotatable (see FIG. 1). Thus, each of the barrel blocks 31a, 31b and 31c and the head portion 36 can be easily integrated by just tightening the nut 203 on the other side.

Furthermore, opposed end faces of each of the barrel blocks 31a, 31b and 31c and the head portion 36 are preferably subjected to specular finish. The adjacent end faces can be thereby brought into close contact with each other without a gap when each of the barrel blocks 31a, 31b and 31c and the head portion 36 are tightened in the axial direction by the connecting rods 201. As a result, the interior of the cylinder portion 33 of the barrel 20 can be made liquid-tight.

The connecting rods 201 are not illustrated in the drawings other than FIG. 1 to make the diagrams in the drawings easily understood.

Figure 11:
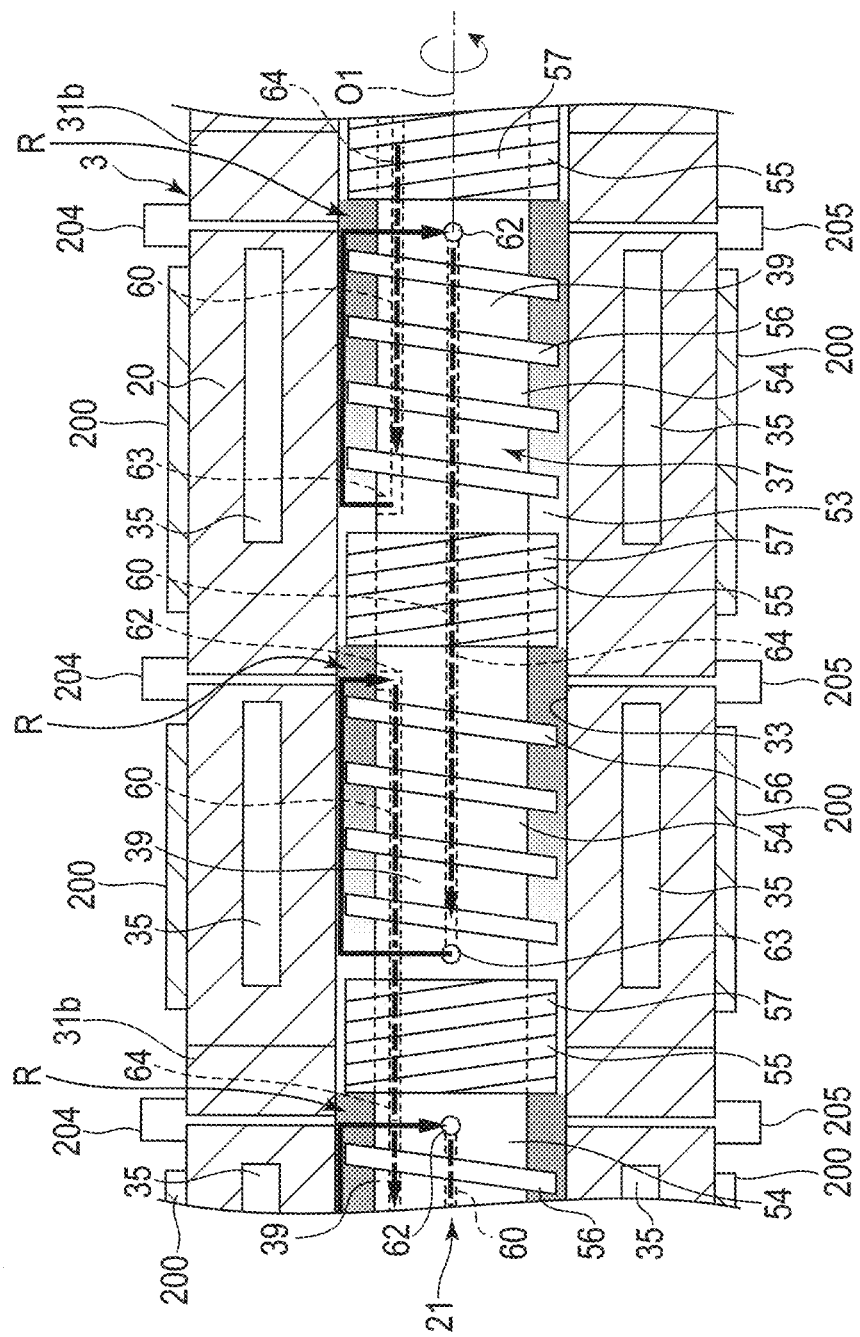
FIG. 11 is a cross-sectional view showing the second extruder of the first embodiment, schematically illustrating the direction of flow of the raw material at rotation of the screw.

Furthermore, as shown in FIG. 5, FIG. 6 and FIG. 11, a temperature sensor 204 and a pressure sensor 205 can be attached to each of the barrel blocks 31a, 31b and the 31c to measure the temperature and the pressure in the liquid-tight cylinder portion 33. That is, attachment holes for attaching various sensors (not shown) are provided in each of the barrel blocks 31a, 31b and the 31c. The attachment holes are formed to make the outer surfaces of the respective barrel blocks 31a, 31b and 31c communicate with the cylinder portion 33 (through holes 32). The temperature and the pressure in the cylinder portion 33 in a state in which, for example, the raw material is kneaded, can be measured accurately by inserting the temperature sensor 204 and the pressure sensor 205 in the attachment holes.

Figure 7:
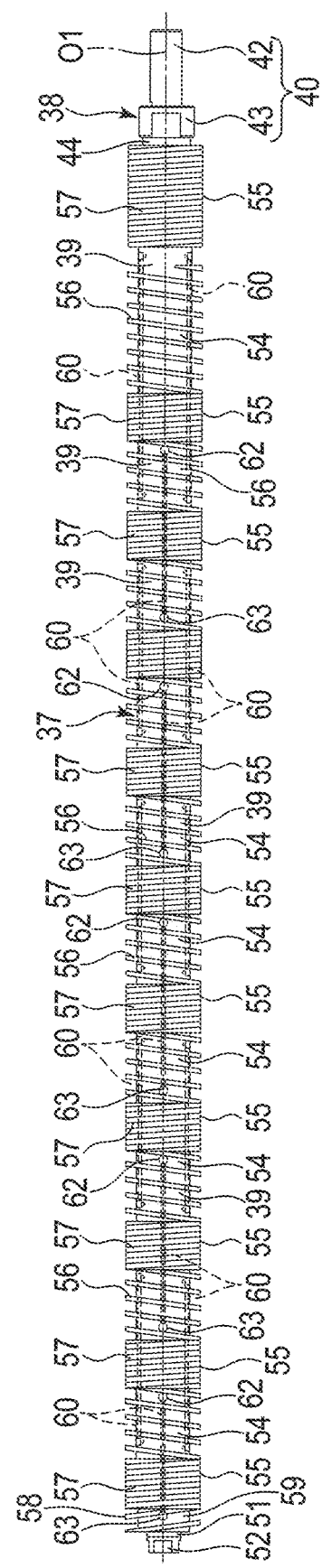
FIG. 7 is a side view showing the screw used in the first embodiment.

As shown in FIG. 5 to FIG. 7, the screw 21 comprises a screw body 37. The screw body 37 of the present embodiment is composed of a rotary shaft 38 and a plurality of tubular bodies 39 shaped in a cylinder.

The rotary shaft 38 comprises a first shaft portion 40 and a second shaft portion 41. The first shaft portion 40 is located at a proximal end of the rotating shaft 38 on the side of an end portion of the barrel 20. The first shaft portion 40 includes a joint portion 42 and a stopper portion 43. The joint portion 42 is coupled to a drive source such as a motor through a coupling (not shown). The stopper portion 43 is provided coaxially with the joint portion 42. The stopper portion 43 is greater in diameter than the joint portion 42.

The second shaft portion 41 extends coaxially from an end face of the stopper portion 43 of the first shaft portion 40. The second shaft portion 41 has a length extending along substantially the entire length of the barrel 20 and has a distal end opposed to the head portion 36. A straight axis O1 coaxially passing through the first shaft portion 40 and the second shaft portion 41 extends horizontally in the axial direction of the rotary shaft 38.

Figure 8:
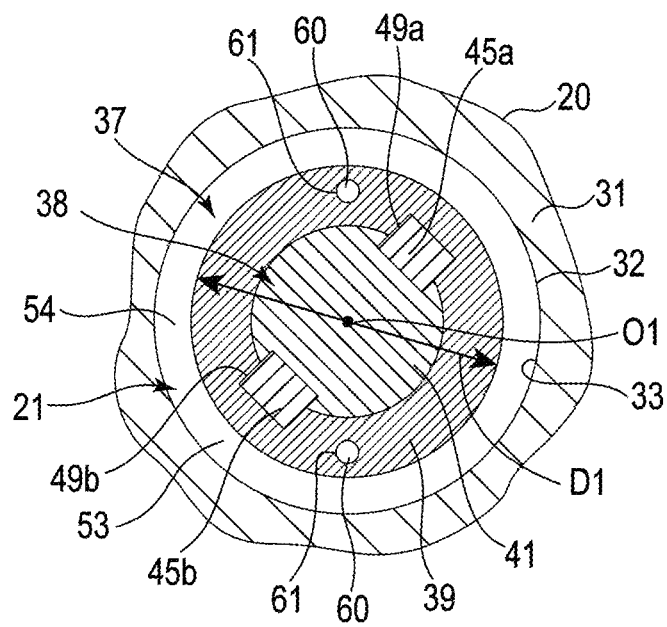
FIG. 8 is a cross-sectional view seen along line F8-F8 in FIG. 6.
Figure 9:
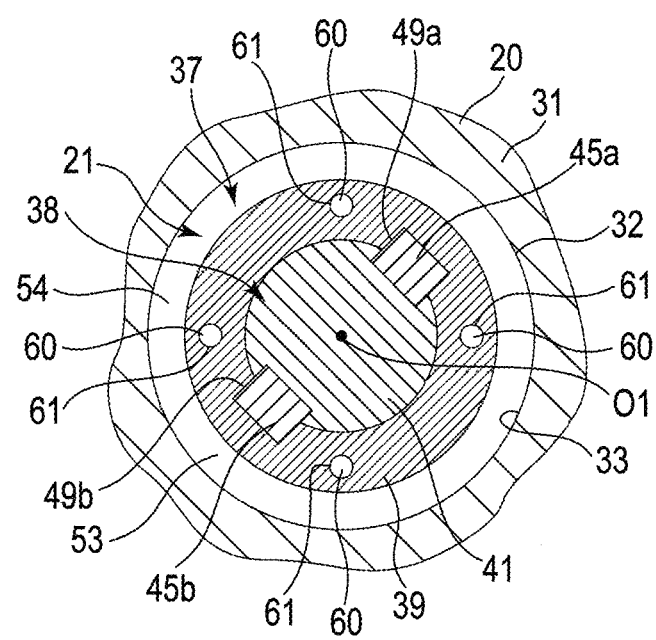
FIG. 9 is a cross-sectional view seen along line F9-F9 in FIG. 6.

The second shaft portion 41 shaped in a solid cylinder having a diameter smaller than the stopper portion 43. As shown in FIG. 8 and FIG. 9, a pair of keys 45a and 45b are attached on the outer peripheral surface of the second shaft portion 41. The keys 45a and 45b extend in the axial direction of the second shaft portion 41 at positions displaced at 180 degrees in a circumferential direction of the second shaft portion 41.

As shown in FIG. 6 to FIG. 9, each of the tubular bodies 39 is configured such that the second shaft portion 41 coaxially penetrates the tubular body. A pair of keyways 49a and 49b are formed on the inner peripheral surface of the tubular body 39. The keyways 49a and 49b extend in the axial direction of the tubular body 39 at positions displaced at 180 degrees in the circumferential direction of the cylindrical body 39.

The tubular body 39 is inserted onto the second shaft portion 41 from the direction of the distal end of the second shaft portion 41 in a state in which the keyways 49a and 49b are made to match the keys 45a and 45b of the second shaft portion 41. In the present embodiment, a first collar 44 is interposed between the tubular body 39 first inserted onto the second shaft portion 41 and the end face of the stopper portion 43 of the first shaft portion 40. Furthermore, a fixing screw 52 is screwed on the distal end surface of the second shaft portion 41 through a second collar 51 after all the tubular bodies 39 are inserted onto the second shaft portion 41.

This screwing urges all the tubular bodies 39 to be tightened between the first collar 44 and the second collar 51 in the axial direction of the second shaft portion 41 and to be held in a state in which the end faces of the adjacent tubular bodies 39 are in close contact with each other without a gap.

At this time, all the tubular bodies 39 are coaxially coupled on the second shaft portion 41, and each of the tubular bodies 39 and the rotary shaft 38 are thereby in the state of being assembled integrally. Accordingly, each of the tubular bodies 39 can be rotated about the axis O1 together with the rotary shaft 38, i.e., the screw body 37 can be rotated about the axis O1.

In this state, each of the tubular bodies 39 is a component which defines the outer diameter D1 (see FIG. 8) of the screw body 37. In other words, the outer diameters D1 of the respective tubular bodies 39 which are coaxially coupled along the second axis portion 41 are set to be equal to each other. The outer diameter D1 of the screw body 37 (each tubular body 39) is the diameter defined through the axis O1 which is the center of rotation of the rotary shaft 38.

The segment-type screw 21 in which the outer diameter D1 of the screw body 37 (each tubular body 39) is a constant value is thereby constituted. The segment-type screw 21 can allow a plurality of screw elements to be held in free order and combination along the rotary axis 38 (i.e., the second shaft portion 41). As for the screw element, for example, the tubular body 39 on which at least several parts of the flights 56, 57 and 58 to be explained later are formed can be defined as a screw element.

Thus, convenience in, for example, change or adjustment of specifications or maintenance, of the screw 21, can be remarkably improved by segmenting the screw 21.

In the present embodiment, a cylindrical tubular body 39, the key 45a, is not limited to being fixed to the rotary shaft 38 by 45b. For example, the tubular body 39 may be fixed on the rotary shaft 38 by using a spline as shown in FIG. 2 instead of the keys 45a and 45b.

Furthermore, the segment-type screw 21 is coaxially accommodated in a cylinder portion 33 of a barrel 20. More specifically, the screw body 37 in which a plurality of screw elements are held along the rotary shaft 38 (second shaft portion 41) is accommodated in the cylinder portion 33 so as to be rotatable. In this state, a first shaft portion 40 (joint portion 42 and stopper portion 43) of the rotary shaft 38 protrudes from one end portion of the barrel 20 to the outside of the barrel 20.

Moreover, in this state, a conveyance path 53 for conveying the raw material is formed between the outer peripheral surface of the screw body 37 in the circumferential direction and the inner peripheral surface of the cylinder portion 33. The conveyance path 53 has an annular cross-section along the radial direction of the cylinder portion 33 and extends axially along the cylinder portion 33.

In the present embodiment, the screw 21 is rotated counterclockwise as seen from the proximal end side of the screw 21 as represented by an arrow in FIG. 5, upon receives a torque from the drive source. At this time, the number of revolutions of the screw 21 is preferably set in a range from 600 rpm to 3000 rpm.

As shown in FIG. 5 to FIG. 7, the screw body 37 comprises a plurality of conveying portions 54 and 59 for conveying the raw material and a plurality of barrier portions 55 for restricting flow of the raw material. That is, the barrier portions 55 are disposed at the proximal end of the screw body 37 corresponding to one end portion of the barrel 20, and the conveying portion 59 for discharge is disposed at the distal end of the screw body 37 corresponding to the other end portion of the barrel 20. Furthermore, the conveying portions 54 and the barrier portions 55 are alternately disposed in the axial direction, from the proximal end toward the distal end of the screw body 37, between the barrier portions 55 and the conveying portions 59.

The feed port 34 of the barrel 20 is opened toward the conveying portion 54 disposed on the side of the proximal end of the screw body 37.

Each of the conveying portions 54 comprises a helically twisted flight 56. The flights 56 protrude toward the conveyance path 53 from the outer peripheral surface of the tubular body 39 in the circumferential direction. The flights 56 are twisted to convey the raw material from the distal end to the proximal end of the screw body 37 when the screw 21 is rotated counterclockwise. In other words, the flights 56 are twisted counterclockwise such that the twisting direction of the flights 56 is the same as that of a left-hand screw.

Furthermore, the conveying portion 59 for discharge comprises a helically twisted flight 58. The flight 58 protrudes toward the conveyance path 53 from the outer peripheral surface of the tubular body 39 along the circumferential direction. The flight 58 is twisted so as to convey the raw material from the proximal end to the distal end of the screw body 37 when the screw 21 is rotated counterclockwise. In other words, the flight 58 is twisted clockwise such that the twisting direction of the flight 58 is the same as that of a right-hand screw.

Each of the barrier portions 55 comprises a helically twisted flight 57. The flight 57 protrudes toward the conveyance path 53 from the outer peripheral surface of the tubular body 39 along the circumferential direction. The flight 57 is twisted so as to convey the raw material from the proximal end to the distal end of the screw body 37 when the screw 21 is rotated counterclockwise. In other words, the flight 57 is twisted clockwise such that the twisting direction of the flight 57 is the same as that of a right-hand screw.

A twist pitch of the flight 57 of each of the barrier portions 55 is set to be equal to or smaller than a twist pitch of the flights 56 and 58 of the conveying portions 54 and 59. Furthermore, a slight clearance is ensured between top portions of the flights 56, 57 and 58 and the inner peripheral surface of the cylinder portion 33.

In this case, the clearance between an outer diameter portion of the barrier portion 55 (the top portion of the flight 57) and the inner peripheral surface of the cylinder portion 33 is desirably set in a range between 0.1 mm or more and 2 mm or less. More desirably, the clearance is set in the range between 0.1 mm or more and 0.7 mm or less. The raw material can be thereby certainly restricted from being conveyed through the clearance.

The axial direction of the screw body 37 can be restated as the longitudinal direction of the screw body 37 or, in other words, the longitudinal direction of the screw 21.

The length of the conveying portions 54 and 59 in the axial direction of the screw body 37 is arbitrarily set in accordance with, for example, the type of the raw material, the degree of kneading of the raw material, the volume of production of the kneaded material per unit time, and the like. The conveying portions 54 and 59 indicate regions in which the flights 56 and 58 are formed on the outer peripheral surface of at least the tubular body 39, but are not specified as regions between start points and end points of the flights 56 and 58.

In other words, regions displaced from the flights 56 and 58, of the outer peripheral surface of the cylindrical body 39, may also be considered as conveying portions 54 and 59. For example, if a cylindrical spacer or a cylindrical collar is disposed at a position adjacent to the cylindrical body 39 comprising the flights 56 and 58, the spacer or the color may also be included in the conveyance portions 54 and 59.

Furthermore, the length of each barrier portion 55 of the screw body 37 in the axial direction is arbitrarily set in accordance with, for example, the type of the raw material, the degree of kneading of the raw material, the volume of production of the kneaded material per unit time, and the like. The barrier portions 55 function to block the flow of the raw material fed by the conveying portions 54. The barrier portions 55 are configured to be adjacent to the conveying portions 54 on a downstream side of the direction of conveyance of the raw material and to prevent the raw material fed by the conveying portions 54 from passing through the clearance between the top portions of the flights 57 and the inner peripheral surface of the cylinder portion 33.

Furthermore, each of the flights 56, 57 and 58 protrudes toward the conveyance path 53 from the outer peripheral surface of the plurality of tubular bodies 39 having the same outer diameter D1, in the screw 21. For this reason, the outer peripheral surface of each tubular body 39 in the circumferential direction defines a root diameter of the screw 21. The root diameter of the screw 21 is kept constant along the entire length of the screw 21.

As shown in FIG. 5 to FIG. 7 and FIG. 10, the screw body 37 comprises a plurality of passages 60 extending in the axial direction inside the screw body 37. When one barrier portion 55 and two conveying portions 54 sandwiching the barrier portion 55 are handled as one unit, the passages 60 are formed across the tubular body 39 of the paired conveying portions 54 and the tubular body 39 of the barrier portion 55.

In this case, the passages 60 are arranged along the axial direction of the screw body 37 so as to be spaced apart at predetermined intervals (for example, regular intervals). Four passages 60 extending in the axial direction of the screw body 37 are arranged at intervals of 90 degrees in the circumferential direction of the screw body 37, at the middle portion of the screw main body 37 in the axial direction.

Furthermore, the passages 60 are provided at positions eccentric from the axis O1 of the rotary shaft 38, inside the tubular bodies 39. In other words, the passages 60 are displaced from the axis O1 and revolve about the axis O1 when the screw body 37 is rotated.

As shown in FIG. 8 and FIG. 9, the passages 60 are, for example, holes having a circular cross-section. An inner diameter of the hole is set at, for example, 1 mm or more and less than 6 mm, preferably, 1 mm or more and less than 5 mm. Furthermore, the tubular body 39 of the conveying portion 54 and barrier section 55 includes tubular wall surfaces 61 which define the holes. That is, the passages 60 are the holes formed of hollow space alone, and the wall surfaces 61 continuously surround the hollow passages 60 in the circumferential direction. The passages 60 are thereby configured as the hollow space which allows the only flow of the raw material. In other words, the other elements forming the screw body 37 do not exist inside the passages 60. Furthermore, the wall surfaces 61 revolve about the axis O1 without rotating about the axis O1 when the screw body 37 is rotated.

As shown in FIG. 5, FIG. 6 and FIG. 11, each of the passages 60 includes an inlet 62, an outlet 63, and a passage body 64 which makes the inlet 62 and the outlet 63 communicate with each other. The inlet 62 and the outlet 63 are provided to be spaced apart from both sides of one barrier portion 55. More specifically, the inlet 62 is opened on the outer peripheral surface in the vicinity of the downstream end of the conveying section 54, at the conveying portion 54 adjacent to the side of the proximal end of the screw body 37 with respect to the barrier portion 55. In addition, the outlet 63 is opened on the outer peripheral surface in the vicinity of the upstream end of the conveying portion 54, at the conveying portion 54 adjacent to the side of the distal end of the screw body 37 with respect to the barrier portions 55.

The passage body 64 extends straight in the axial direction of the screw body 37 without being branched in the middle. For example, the passage body 64 extending parallel to the axis O1 is illustrated in the drawings. Both sides of the passage body 64 are closed in the axial direction.

The inlet 62 is provided on one side of the passage body 64, i.e., the portion closer to the proximal end of the screw body 37. In this case, the inlet 62 may be opened to the outer peripheral surface of the screw body 37 from the one side end surface of the passage body 64 or may be opened to the outer peripheral surface of the screw body 37 from the portion closer to one side end surface of the passage body 64, i.e., the portion in front of the end surface. The opening direction of the inlet 62 is not limited to the direction orthogonal to the axis O1 but may be a direction intersecting the axis O1. In this case, the passage body 64 may be opened from one side in a plurality of directions and a plurality of inlets 62 may be thereby provided.

In the other recognition, the inlet 62 is opened to the outer peripheral surface of the conveying portion 54 spaced from the barrier portion 55 in the direction of the proximal end of the screw body 37, for each unit explained above. The inlet 62 is desirably provided at the farthest position in the direction of the proximal end of the screw body 37, on the outer peripheral surface the tubular member 39 constituting the conveying portion 54. The inlet 62 is thereby located just before the adjacent barrier portions 55 in the direction of the proximal end of the screw body 37 for the conveying portion 54 to which the inlet 62 is opened.

The outlet 63 is provided on the other side (i.e., the side opposite to one side) of the passage body 64, i.e., the portion closer to the distal end of the screw body 37. In this case, the outlet 63 may be opened from the end face of the other side of the passage body 64 to the outer peripheral surface of the screw body 37 or, the portion closer to the other side end surface of the passage body 64, i.e. the front end face it may be caused to open from the portion on the outer peripheral surface of the screw body 37. The opening direction of the outlet 63 is not limited to the direction orthogonal to the axis O1 but may be a direction intersecting the axis O1. In this case, the passage body 64 may be opened from one side in a plurality of directions and a plurality of outlets 63 may be thereby provided.

In the other recognition, the outlet 63 is opened to the outer peripheral surface of the conveying portion 54 spaced from the barrier portion 55 in the direction of the distal end of the screw body 37, for each unit explained above. The outlet 63 is desirably provided at the farthest position in the direction of the distal end of the screw body 37, on the outer peripheral surface the tubular member 39 constituting the conveying portion 54.

The passage body 64 connecting the inlet 62 and the outlet 63 crosses the barrier portion 55 for each unit explained above, and has a length extending across two conveying portions 54 sandwiching the barrier portion 55. In this case, the diameter of the passage body 64 may be set to be smaller than or equal to the diameter of the inlet 62 and outlet 63. In either of the cases, the passage cross-sectional area defined by the diameter of the passage body 64 is set to be much smaller than the annular cross-sectional area of the annular conveying path 53 in the radial direction.

In the present embodiment, when the screw 21 is disassembled by removing a plurality of tubular bodies 39 on which the flights 56, 57 and 58 are formed from the rotary axis 38, the tubular bodies 39 on which at least several parts of the flights 56, 57 and 58 are formed may be referred to as the screw elements explained above.

Then, the screw body 37 of the screw 21 can be configured by sequentially arranging a plurality of tubular bodies 39 as screw elements, on the outer periphery of the rotary shaft 38. For this reason, for example, the exchange and recombination of the conveying portion 54 and the barrier portion 55 can be executed in accordance with the degree of kneading of the raw material, and the work of exchange and recombination can easily be executed.

Furthermore, the passage bodies 64 of the passages 60 are formed and the inlets 62 and the outlets 63 of the passages 60 are made to integrally communicate with each other through the passage bodies 64, by tightening a plurality of tubular bodies 39 in the axial direction of the second shaft portion 41 and bringing the end faces of the adjacent tubular bodies 39 into close contact with each other. For this reason, when the passages 60 are formed in the screw body 37, each of the tubular bodies 39 having a length much shorter than the entire length of the screw body 37 may be processed. Thus, the workability and handling upon forming the passages 60 are easily improved.

According to the high-shearing processing apparatus 1 thus configured, the first extruder 2 preliminarily kneads a plurality of resins. The resins become the raw material having fluidity by the kneading, and are continuously fed from the first extruder 2 to the conveyance path 53 through the feed port 34 of the second extruder 3.

Figure 10:
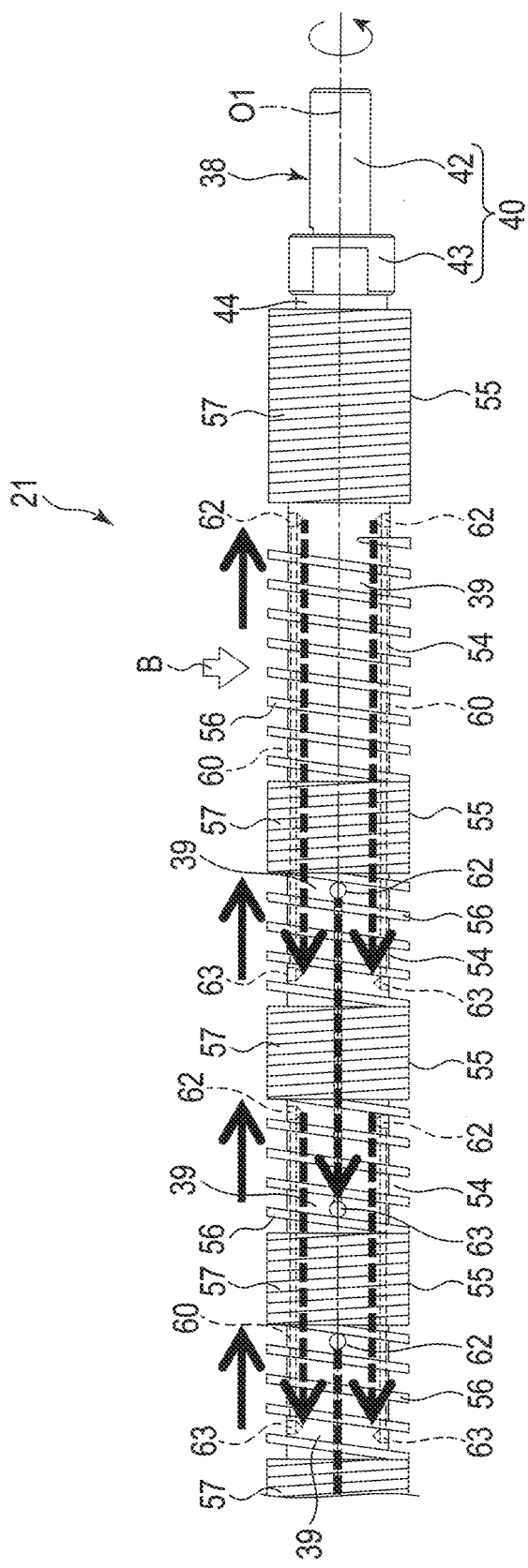
FIG. 10 is a side view showing a direction of flow of a raw material with respect to the screw in the first embodiment.

The raw material fed to the second extruder 3 is introduced into the outer peripheral surface of the conveying portion 54 located on the side of the proximal end of the screw body 37 as represented by arrow B in FIG. 10. At this time, when the screw 21 is rotated counterclockwise as seen from the proximal end of the screw body 37, the flight 56 of the conveying portion 54 continuously conveys the raw material toward the barrier portion 55 adjacent to the proximal end of the screw body 37 as represented by an arrow of a solid line in FIG. 10.

At this time, the shearing action generated based on the velocity difference between the flight 56 rotated along the conveyance path 53 and the inner peripheral surface of the cylinder portion 33 is imparted to the raw material, and the raw material is stirred by the subtle degree of twisting of the flight 56. As a result, the raw material is completely kneaded and dispersion of the polymeric component of the raw material proceeds.

The raw material having received the shearing action reaches the boundary between the conveying portion 54 and the barrier portion 55 along the conveyance path 53. The flight 57 of the barrier portion 55 is twisted to the right direction so as to convey the raw material from the proximal end to the distal end of the screw body 37 when the screw 21 is rotated counterclockwise. As a result, the conveyance of the raw material is blocked by the flight 57. In other words, when the screw 21 is rotated counterclockwise, the flight 57 of the barrier portion 55 prevents the raw material from passing through the clearance between the barrier portion 55 and the inner peripheral surface of the cylinder portion 33 by limiting the flow of the raw material conveyed by the flight 56.

At this time, the pressure of the raw material is increased at the boundary between the conveying portion 54 and the barrier portion 55. More specifically, a filling rate of the raw material at the part corresponding to the conveying portion 54 of the screw body 37, of the conveyance path 53, is represented with gradations in FIG. 11. In other words, the filling rate of the raw material is higher as the tone becomes darker, in the transport path 53. As apparent from FIG. 11, the filling rate of the raw material is higher at a position closer to the barrier portion 55, in the conveyance path 53 corresponding to the conveying portion 54, and the filling rate of the raw material is 100% just in front of the barrier portion 55.

For this reason, "raw material reservoir R" in which the filling rate of the raw material is 100% formed just in front of the barrier portion 55. In the raw material receiver R, the flow of the raw material is stopped and, thus, the pressure on the raw material is increased. The raw material having the pressure increased continuously flows into the passage body 64 from the inlet 62 opened in the outer peripheral surface of the conveying portion 54 and continuously flows from the proximal end toward the distal end of the screw body 37 in the passage body 64, as represented by an arrow of a broken line in FIG. 10 and FIG. 11.

As explained above, the passage cross-sectional area defined by the diameter of the passage body 64 is much smaller than the annular cross-sectional area of the conveyance path 53 along the radial direction of the cylinder portion 33. In the other recognition, a spread region based on the diameter of the passage body 64 is much smaller than a spread region of the annular conveyance path 53. For this reason, when the raw material flows from the inlet 62 into the passage body 64, the raw material is narrowed sharply and an extension action is thereby imparted to the raw material.

Furthermore, since the passage cross-sectional area is sufficiently smaller than the annular cross-sectional area, the raw material collected in the raw material receiver R does not disappear. That is, part of the raw material collected in the raw material reservoir R continuously flows into the inlet 62. During this time, a new raw material is fed toward the barrier portion 55 by the flight 56. As a result, the filling rate in the raw material reservoir R just in front of the barrier portion 55 is maintained at 100% at any time. At this time, even if some variation occurs in the amount of conveyance of the raw material conveyed by the flight 56, the variation state is absorbed by the raw material remaining in the raw material reservoir R. The raw material can be thereby fed to the passage 60 continuously and stably. The extension action can be therefore continuously imparted to the raw material without interruption, in the passage 60.

The raw material which has passed through the passage body 64 flows out from the outlet 63 as represented by an arrow of a solid line in FIG. 11. The raw material is thereby continuously fed back onto the outer peripheral surface of the other conveying portion 54 adjacent to the barrier portion 55, on the distal end side of the screw body 37. The raw material fed back is continuously conveyed in the direction of the proximal end of the screw body 37 by the flight 56 of the conveying portion 54 and receives the shearing action again during the conveyance. The raw material having received the shearing action continuously flows into the passage body 64 from the inlet 62 and receives the extension action again during flowing through the passage body 64.

In the present embodiment, a plurality of conveying portions 54 and a plurality of barrier portions 55 are alternately arranged in the axial direction of the screw body 37, and a plurality of passages 60 are arranged in the axial direction of the screw body 37 so as to be spaced apart at intervals. For this reason, the raw material introduced into the screw body 37 from the feed port 34 is continuously conveyed from the proximal end to the distal end of the screw body 37 while alternately subjected to the shearing action and the extension action, as represented by the arrows in FIG. 10 and FIG. 11. Therefore, the degree of kneading of the raw material is increased and dispersion of the polymeric component of the raw material is promoted.

Then, the raw material which has reached the distal end of the screw body 37 becomes a fully kneaded material and flows out from the outlets 63 of the passages 60. The flowing kneaded material is continuously conveyed to the gap between the cylinder portion 33 and the head portion 36 by the flight 58 of the conveying portion 59 for discharge and then continuously fed to the third extruder 4 from the discharge port 36a.

In the third extruder 4, as already explained, gaseous substances and other volatile components contained in the kneaded material are continuously removed from the kneaded material. The kneaded material from which the gaseous substances and other volatile substances have been removed is continuously discharged to the outside of the high shear processing apparatus 1 through the discharge port 28 of the head portion 27. The discharged kneaded material is immersed in cooling water stored in a water tank. As a result, the kneaded material is thereby forcibly cooled and a desired resin molded article can be obtained.

According to the first embodiment, as described above, the raw material fed from the first extruder 2 is conveyed while repeatedly inverted at plural times in the axial direction of the screw body 37, in the second extruder 3, and the shearing action and the extension action are repeatedly imparted to the raw material during this conveyance. In other words, since the raw material does not circulate at a number of times at the same position on the outer peripheral surface of the screw body 37, the raw material can be continuously fed from the second extruder 3 to the third extruder 4 without interruption.

Thus, the sufficiently kneaded material can be continuously molded, and the efficiency of production of the kneaded material can be dramatically increased in comparison with a badge type extruder.

At the same time, the resin preliminarily kneaded in the first extruder 2 is continuously fed to the second extruder 3 without interruption. For this reason, the flow of the resin is not temporarily stopped in the first extruder 2. The temperature variation, viscosity variation or phase change of the resin which occur due to the kneaded resin retained inside the first extruder 2 can be thereby prevented. As a result, the raw material of a constantly uniform quality can be fed from the first extruder 2 to the second extruder 3.

Furthermore, according to the first embodiment, not the apparently continuous production, but completely continuous production of the kneaded material can be executed. That is, the shearing action and the elongation action can be alternately imparted to the raw material in the second extruder 3 while continuously conveying the raw material without interruption from the first extruder 2 to the second extruder 3 and the third extruder 4. According to such a structure, the raw material in a molten state is stably fed from the first extruder 2 to the second extruder 3.

Furthermore, according to the first embodiment, each of the first extruder 2 and the second extruder 3 can be set under optimum operating conditions while associating the operating conditions of the extruders with each other upon executing the completely continuous production. For example, when the resin is preliminarily kneaded in the first extruder 2, the screw rotation speed can be operated at conventional 100 rpm up to 300 rpm. For this reason, sufficient heating and melting, and preliminary kneading of the resin can be executed. In contrast, the screw 21 can be rotated at 600 rpm up to a high speed of 3000 rpm, in the second extruder 3. For this reason, the shearing action and the extension action can be imparted to the resin alternately and effectively.

Along with this, the first extruder 2 and the second extruder 3 may be provided with screws in accordance with the roles or functions of the respective extruders. That is, the first extruder 2 may be provided with the screws 7a and 7b in accordance with the role or function of preliminarily kneading the fed material. In contrast, the second extruder 3 may be provided with the screw 21 in accordance with the role or function of imparting the shearing action and the extension action to the raw material in the molten state fed from the first extruder 2. The elongation of the first extruder 2 and the second extruder 3 can be thereby prevented.

A result of a high dispersion confirmation test for the kneaded material in a case where the raw material is kneaded by alternately imparting the shearing action and the extension action in the completely continuous production will be explained.

In the test, two types of materials, i.e., polycarbonate resin (PC) and polymethyl methacrylate resin (PMMA) were fed to the first extruder 2 having an effective length (L/D) of the kneading portion 12 set at 7.9 with respect to the screw effective length (L/D), and a material in a molten state was produced by kneading the materials. Then, the material in the molten state was continuously fed from the first extruder 2 to a second extruder 3 as a raw material of the second extruder 3.

In the test, the screw 21 was configured so as to urge the shearing and extending operations to be repeated at ten times. Then, the specifications of the screw 21 were set as follows. That is, the screw diameter was set at 36 mm, the screw effective length (L/D) was set at 25, the number of revolutions of the screw was set at 1400 rpm, the raw material supply amount was set at 1.4 kg/h, and the barrel set temperature was set at 260° C.

According to this test, the intended transparent kneaded materials were continuously obtained.

According to the first embodiment, the passages 60 revolve around the axis O1 since the passages 60 imparting the extension action to the raw material extend in the axial direction of the screw body 37, at the positions eccentric to the axis O1 which is a center of rotation of the screw body 37. In other words, tubular wall surfaces 61 defining the passages 60 revolve around the axis O1 without rotating about the axis O1.

For this reason, the raw material receives the centrifugal force but is not actively stirred in the passages 60 when the raw material passes through the passages 60. Therefore, the raw material passing through the passages 60 can hardly receive the shearing action and the raw material fed back to the outer peripheral surface of the conveying portion 54 through the passages 60 mainly receives the extension action.

Therefore, according to the screw 21 of the first embodiment, the position at which the shearing action is imparted to the raw material and the position at which the extension action is imparted to the raw material can be clearly determined. Therefore, an advantageous structure can be obtained in view of the detection of the degree of kneading of the raw material and the degree of kneading can be controlled with high accuracy. As a result, the kneaded material having the microscopic dispersion structure in which the polymeric components of the raw material are nano-dispersed can be produced.

In addition, since all the plurality of passages 60 are eccentric relative to the axis O1, the extension action can be uniformly imparted to the raw material passing through the plurality of passages 60. That is, variation in conditions for kneading in the plurality of passages 60 can be overcome and uniform kneading can be executed.

Furthermore, in the screw 21 of the present embodiment, if one barrier portion 55, two conveying portions 54 adjacent to both sides of the barrier portion, and at least one passage 60 formed to extend from the conveying portions 54 to the barrier portion 55 are handled as one unit, the units are provided in the axial direction (longitudinal direction of the screw 21) under a certain rule.

This unit can be regarded as "screw element" having a constant length in the axial direction as a minimum unit for kneading the raw material. In the screw 21 of the present embodiment, the "screw elements" and the barrier portions 55 are disposed alternately. In other words, the "screw elements" are disposed at regular intervals through the barrier portions 55.

Accordingly, various conditions occurring at each "screw element", for example, "pressure rise", "temperature rise" associated with the pressure increase, and the like appear at regular intervals in the axial direction of the screw 21. The "pressure rise" remarkably appears at, for example, the portion (raw material reservoir R) at which the raw material conveyed by the conveying portions 54 is blocked by the barrier portions 55, and the position of the "raw material reservoir R" appears with regular intervals in the axial direction of the screw 21.

Furthermore, each "screw element" comprises the portion (conveying section 54) which imparts the shearing action to the raw material and the portion (passage 60) which imparts the extension action to the raw material, and these portions are also formed with regular intervals in the axial direction of the screw 21.

In this case, each middle barrel block 31b other than the barrel blocks 31a and 31c on both sides of the barrel 20, of a plurality of barrels blocks 31a, 31b and 31c as described above, is desirably configured to correspond to the length of each "screw element" in the length direction of the screw 21.

As the measure to make the barrel block 31b and the "screw element" correspond to each other, for example, making the length of the barrel block 31b in the longitudinal direction of the screw correspond to the length of the "screw element" in the longitudinal direction of the screw 21 is assumed. In this case, the length of the barrel block 31b may be set to an integral multiple of the length of the "screw element" or may be set to a fraction of an integer.

Furthermore, the length of the barrel block 31b may be set to be equal to the length of the "screw element".

An example of the configuration of the screw 21 in which the length of the barrel block 31b is set, configuration of the screw 21 is set to be equal to the length of the "screw element" is illustrated. That is, one of the "screw elements" is made to correspond within the range of the length of one barrel block 31b. More specifically, the length of one barrel block 31b is set to be within a range over central portions of two barrier portions 55 adjacent to both sides of one "screw element".

For example, if providing three "screw elements" under a certain rule, i.e., with regular intervals in the axial direction (longitudinal direction of the screw 21) is assumed, the "screw elements" and the barrier unit 55 are alternately arranged alternately and repeatedly at three times, between the proximal end and the distal end of the screw 21.

At this time, to constitute the cylinder portion 33 in which the screw 21 is inserted to be rotatable, in the barrel 20, three barrels blocks 31b may be interposed between the barrel block 31a and 31c disposed on both ends and may be integrated with each other by the connecting rod 201 in this state.

The barrel 20 thereby has a barrel structure considering the rule of three "screw elements". At this time, a positional relationship of one of the barrel blocks 31b opposed to one "screw element" is formed in a state in which the screw 21 is inserted into the cylinder portion 33 of the barrel 20 so as to be rotatable.

According to this configuration, when the raw material is kneaded by rotating the screw 21, various states occurring for each of the "screw elements" (for example, pressure rise, temperature rise and raw material reservoir R) are defined at specific positions in the longitudinal direction of the screw 21, in each of the barrel blocks 31b.

For example, if a state in which the raw material conveyed by the conveying portion 54 is blocked by the barrier portion 55 is assumed, the state "raw material reservoir R" appears at the boundary between the conveying portion 54 and the barrier portion 55. Furthermore, the state called "pressure rise" or "temperature rise" appears at the boundary between the conveying portion 54 and the barrier portion 55 by the increased pressure of the raw material.

Such various states (pressure rise, temperature rise, and raw material reservoir R) appear at constant positions at any time in the longitudinal direction of the screw 21 in each of the "screw elements". Thus, various states (pressure rise, temperature rise, and raw material reservoir R) are, inevitably, defined at specific positions at any time, in the longitudinal direction of the screw 21 of each barrel block 31b in each barrel block 31b in a positional relationship of being opposed to each of "screw elements".

Therefore, variation in pressure and temperature occurring during kneading the raw material can be measured directly in real time, by disposing, for example, the temperature sensor 204 and the pressure sensor 205 at the "specific positions". Then, the temperature of the barrel 20 can be maintained in a state optimum for kneading the raw material, by executing ON/OFF control of the heater 200 and the flow control of the refrigerant to the refrigerant passage 35, based on the measurement results.

The "specific positions" can be preliminarily recognized for each of the barrel block 31b. Therefore, attachment holes (not shown) for attachment of the measurement elements can be preliminarily formed at, for example, the manufacturing stage of the barrel blocks 31b. Various states occurring for each of the screw elements can be thereby measured directly in real time, by only attaching the measurement elements at the "specific positions".

An example of the barrel block 31b in which temperature sensors 204 and pressure sensors 205 are disposed to be opposed to the inlets 62 of the passages 60 and in which heaters 200 and refrigerant passages 35 are disposed to be opposed to two conveying portions 54 adjacent to both sides of the barrier portions 55, is illustrated in the drawings, but this is merely an example and they can be freely disposed within each of the "screw elements".

Thus, the barrel 20 which can easily be changed to the barrel structure considering the rule of the "screw elements" can be implemented by forming the barrel blocks 31b in response to the length of the "screw elements" in the longitudinal direction of the screw 21. For example, if one "screw element" is increased, one barrel block 31b may be increased in response to the increase and, conversely, if one "screw element" is reduced, one barrel block 31b may be reduced in response to the reduction.

Thus, addition or reduction of the barrel blocks 31b can correspond to the variation in configuration of the screw 21 or the variation in the screw length associated with the variation in configuration. For this reason, troublesome work which has been conventionally required, such as finely adjusting the length of the screw 21 in accordance with the length of the cylinder portion 33, is absolutely unnecessary.

Furthermore, even if the barrel structure is changed to that considering the rule of the "screw elements", the second extruder 3 thereby implemented can be connected between the first extruder (processor) and the third extruder (defoamer) 4, similarly to the structure obtained before change.

Moreover, the temperature management and pressure management can be executed for each zone including one of the "screw elements" by forming the barrel structure considering the rule of the "screw elements". The actual kneading can correspond to the variation in temperature and pressure by managing the temperature and pressure in each zone since the temperature and pressure are varied at random in the conveying direction of the raw material.

In the above embodiment, the screw 21 in which the length of the barrel block 31b is set to be equal to the length of the "screw element" is assumed but, it should be noted that in a case where the length is set to an integral multiple (for example, two times), two "screw elements" are simultaneously increased or decreased if one barrel block 31b is increased or decreased. In addition, attention should be paid to a point that if the length of the barrel block 31b is set to a fraction of an integer (for example, ½) of the length of the "screw element", two barrel blocks 31b need to be increased or decreased.

Second Embodiment

FIG. 12 to FIG. 17 disclose a second embodiment. The second embodiment is different from the first embodiment with respect to matters concerning a screw body 37. The structure of a screw 21 other than this is basically the same as that in the first embodiment. For this reason, elements in the second embodiment similar to those of the first embodiment are denoted by like reference numerals and their detailed descriptions are omitted.

Figure 12:
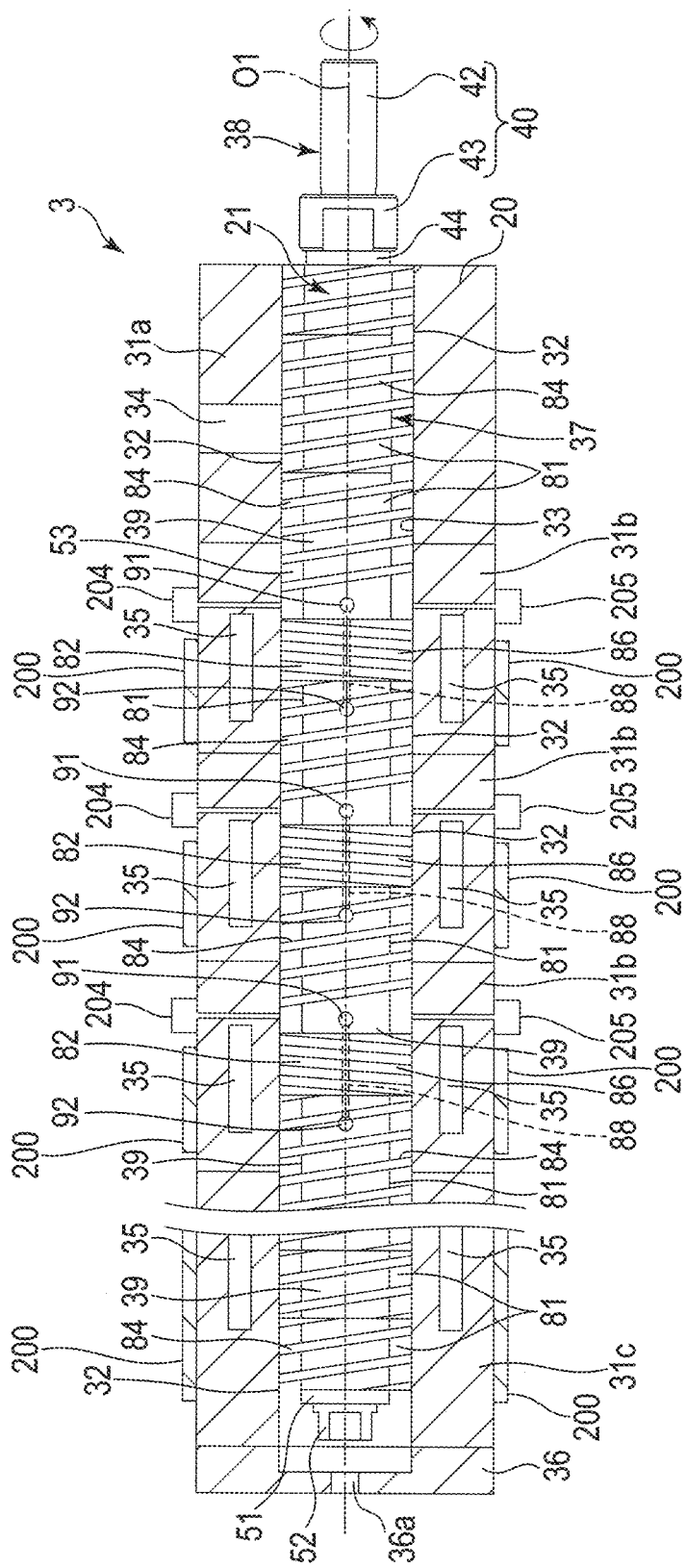
FIG. 12 is a cross-sectional view showing a second extruder used in a second embodiment.
Figure 13:
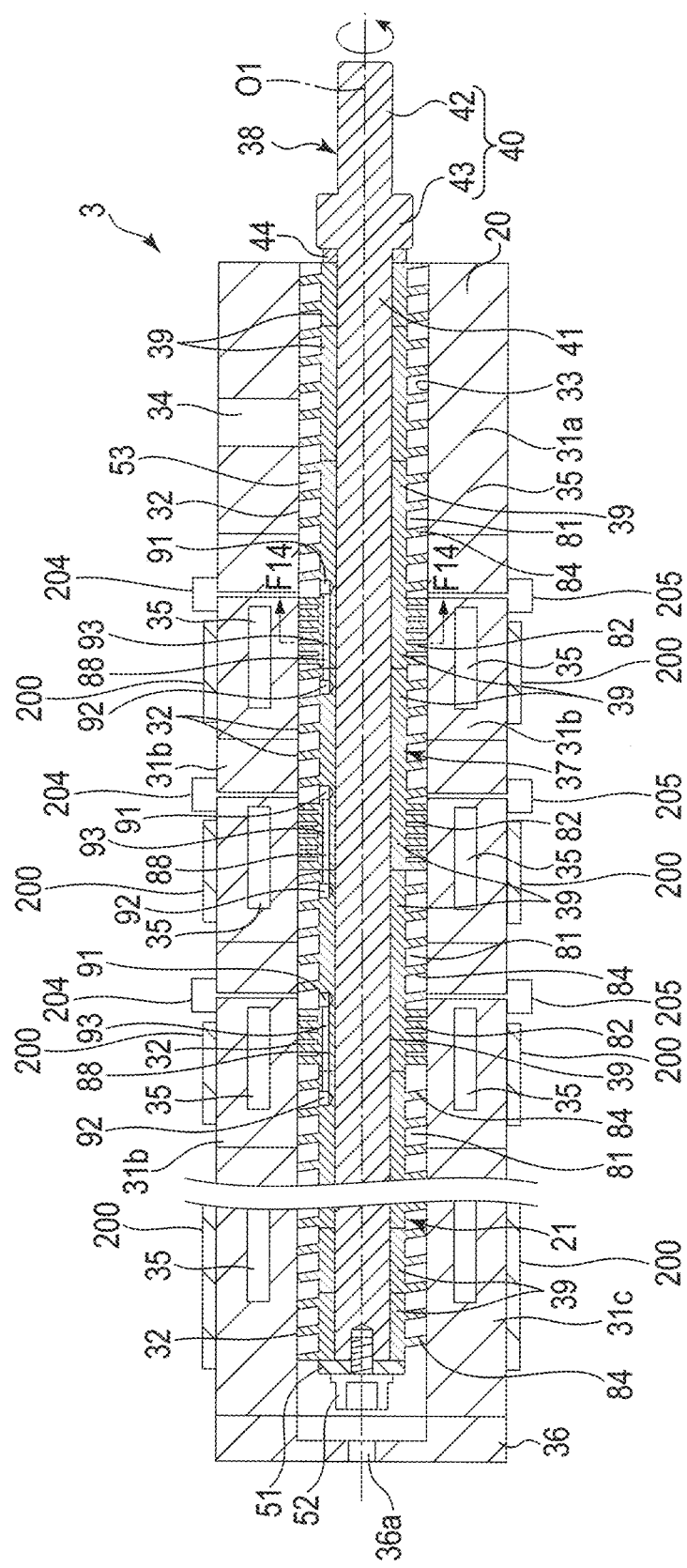
FIG. 13 is a cross-sectional view showing the second extruder of the second embodiment, illustrating cross-sections of a barrel and a screw.

As shown in FIG. 12 and FIG. 13, a plurality of cylindrical tubular bodies 39 constituting a screw body 37 are tightened between a first collar 44 and a second collar 51 in the axial direction of a second shaft portion 41 such that end faces of the adjacent tubular body 39 are in close contact with each other without a gap, similarly to the first embodiment.

At this time, all the tubular bodies 39 are coaxially coupled on the second shaft portion 41, and each of the tubular bodies 39 and a rotary shaft 38 are in the state of being assembled integrally. Accordingly, each of the tubular bodies 39 can be rotated about the axis O1 together with the rotary shaft 38, i.e., the screw body 37 can be rotated about the axis O1.

In this state, each of the tubular bodies 39 is a component which defines an outer diameter D1 (see FIG. 14) of the screw body 37. In other words, the outer diameters D1 of the respective tubular bodies 39 which are coaxially coupled along the second axis portion 41 are set to be equal to each other. The outer diameter D1 of the screw body 37 (each tubular body 39) is the diameter defined through the axis O1 which is the center of rotation of the rotary shaft 38.

The segment-type screw 21 in which the outer diameter D1 of the screw body 37 (each tubular body 39) is a constant value is thereby constituted. The segment-type screw 21 can allow a plurality of screw elements to be held in free order and combination along the rotary axis 38 (i.e., the second shaft portion 41). As for the screw element, for example, the tubular body 39 on which at least several parts of flights 84 and 86 to be explained later are formed can be defined as a screw element.

Thus, convenience in, for example, change or adjustment of specifications or maintenance, of the screw 21, can be remarkably improved by segmenting the screw 21.

Furthermore, the segment-type screw 21 is coaxially accommodated in a cylinder portion 33 of a barrel 20. More specifically, the screw body 37 in which a plurality of screw elements are held along the rotary shaft 38 (second shaft portion 41) is accommodated in the cylinder portion 33 so as to be rotatable. In this state, a first shaft portion 40 (joint portion 42 and stopper portion 43) of the rotary shaft 38 protrudes from one end portion of the barrel 20 to the outside of the barrel 20.

Moreover, in this state, a conveyance path 53 for conveying the raw material is formed between the outer peripheral surface of the screw body 37 in the circumferential direction and the inner peripheral surface of the cylinder portion 33. The conveyance path 53 has an annular cross-section along the radial direction of the cylinder portion 33 and extends in the axial direction of the cylinder portion 33.

As shown in FIG. 12 to FIG. 15, the screw body 37 comprises a plurality of conveying portions 81 for conveying the raw material and a plurality of barrier portions 82 for restricting flow of the raw material. That is, the plurality of conveying portions 81 are disposed at the proximal end of the screw body 37 corresponding to one end portion of the barrel 20, and the plurality of conveying portions 81 are disposed at the distal end of the screw body 37 corresponding to the other end portion of the barrel 20. Furthermore, the conveying portions 81 and the barrier portions 82 are alternately disposed in the axial direction, from the proximal end toward the distal end of the screw body 37, between the conveying portions 81.

A feed port 34 of the barrel 20 is opened toward the conveying portion 81 disposed on the side of the proximal end of the screw body 37.

Each of the conveying portions 81 comprises a helically twisted flight 84. The flight 84 protrudes toward the conveyance path 53 from the outer peripheral surface of the tubular body 39 along the circumferential direction. The flight 84 is twisted so as to convey the raw material from the proximal end to the distal end of the screw body 37 when the screw 21 is rotated counterclockwise as seen from the proximal end of the screw body 37. In other words, the flight 84 is twisted clockwise such the same as that of a right-hand screw.

Each of the barrier portions 82 comprises a helically twisted flight 86. The flight 86 protrudes toward the conveyance path 53 from the outer peripheral surface of the tubular body 39 along the circumferential direction. The flight 86 is twisted so as to convey the raw material from the distal end to the proximal end of the screw body 37 when the screw 21 is rotated counterclockwise as seen from the proximal end of the screw body 37. In other words, the flight 86 is twisted counterclockwise such the same as that of a left-hand screw.

A twist pitch of the flight 86 of each barrier portion 82 is set to be equal to or smaller than a twist pitch of the flight 84 of the conveying portion 81. Furthermore, a slight clearance is secured between the tops of flights 84 and 86 and the inner peripheral surface of the cylindrical portion 33 of the barrel 20. In this case, the clearance between an outer diameter portion of the barrier portion 82 (the top portion of the flight 86) and the inner peripheral surface of the cylinder portion 33 is desirably set in a range between 0.1 mm or more and 2 mm or less. More desirably, the clearance is set in the range between 0.1 mm or more and 0.7 mm or less. The raw material can be thereby certainly restricted from being conveyed through the clearance.

The length of the conveying portions 81 in the axial direction of the screw body 37 is arbitrarily set in accordance with, for example, the type of the raw material, the degree of kneading of the raw material, the volume of production of the kneaded material per unit time, and the like. The conveyance portions 81 are regions where the flights 84 are formed at least on the outer peripheral surfaces of the cylindrical members 39 but are not limited to regions between the start and end points of flights 84.

In other words, regions displaced from the flights 84, on the outer peripheral surface of the cylindrical body 39, may also be considered as the conveying portions 81. For example, if a cylindrical spacer or a cylindrical collar is disposed at a position adjacent to the cylindrical body 39 comprising the flights 84, the spacer or the collar may also be included in the conveyance portions 81.

Furthermore, the length of each barrier portion 82 of the screw body 37 in the axial direction is arbitrarily set in accordance with, for example, the type of the raw material, the degree of kneading of the raw material, the volume of production of the kneaded material per unit time, and the like. The barrier portions 82 function to block the flow of the raw material fed by the conveying portions 81. The barrier portions 82 are configured to be adjacent to the conveying portions 81 on a downstream side of the direction of conveyance of the raw material and to prevent the raw material fed by the conveying portions 81 from passing through the clearance between the top portions of the flights 86 and the inner peripheral surface of the cylinder portion 33.

Furthermore, each of the flights 84 and 86 protrudes toward the conveyance path 53 from the outer peripheral surface of the plurality of tubular bodies 39 having the same outer diameter D1, in the screw 21. For this reason, the outer peripheral surface of each tubular body 39 in the circumferential direction defines a root diameter of the screw 21. The root diameter of the screw 21 is kept constant along the entire length of the screw 21.

Figure 16:
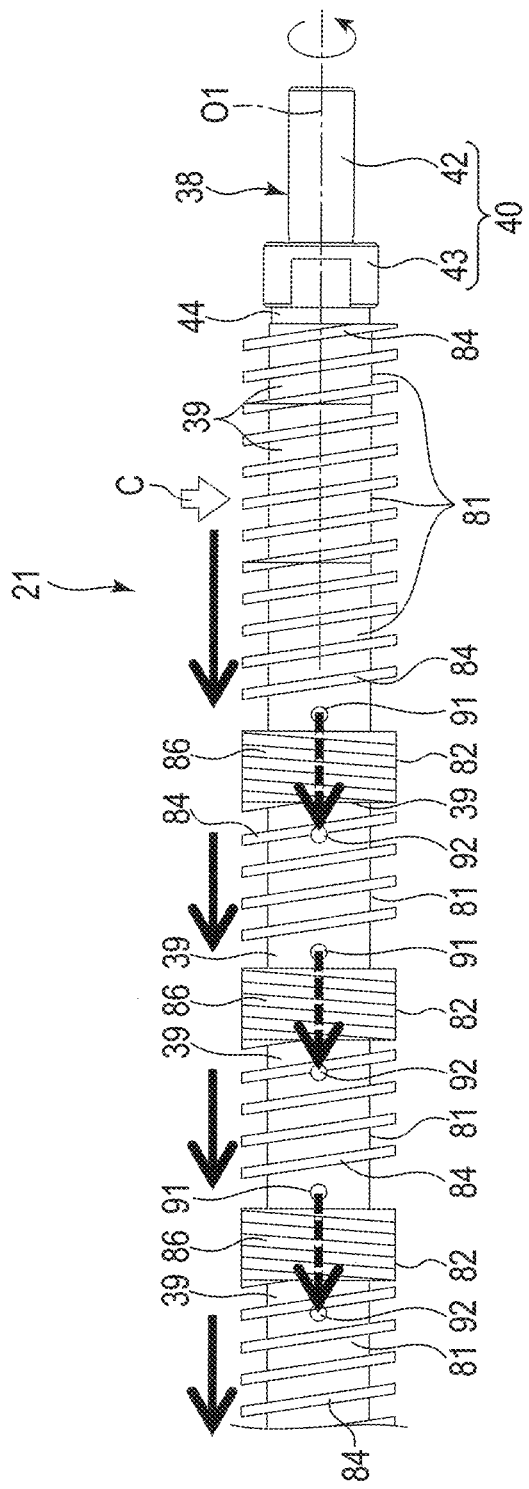
FIG. 16 is a side view showing a direction of flow of a raw material with respect to the screw in the second embodiment.

As shown in FIG. 12, FIG. 13 and FIG. 16, the screw body 37 comprises a plurality of passages 88 extending in the axial direction of the screw body 37. When one barrier portion 82 and two conveying portions 81 sandwiching the barrier portion 82 are handled as one unit, passages 88 are formed across the tubular body 39 of the paired conveying portions 81 and the tubular body 39 of the barrier portion 82. In this case, the passages 88 are aligned in the same straight line along the axial direction of the screw body 37 so as to be spaced apart at predetermined intervals (for example, regular intervals).

Furthermore, the passages 88 are provided at positions eccentric from the axis O1 of the rotary shaft 38, inside the tubular bodies 39. In other words, the passages 88 are displaced from the axis O1 and revolve about the axis O1 when the screw body 37 is rotated.

As shown in FIG. 14, the passage 88 is, for example, a hole having a circular cross-section. An inner diameter of the hole is set at, for example, 1 mm or more and less than 6 mm, preferably, 1 mm or more and less than 5 mm. Furthermore, the tubular body 39 of the conveying portion 81 and barrier section 82 includes tubular wall surfaces 61 which define the holes. That is, the passage 88 is the hole formed of hollow space alone, and the wall surface 89 continuously surrounds the hollow passage 88 in the circumferential direction. The passage 88 is thereby configured as the hollow space which allows the only flow of the raw material. In other words, the other elements forming the screw body 37 do not exist inside the passage 88. Furthermore, the wall surface 89 revolves about the axis O1 without rotating about the axis O1 when the screw body 37 is rotated.

Figure 17:
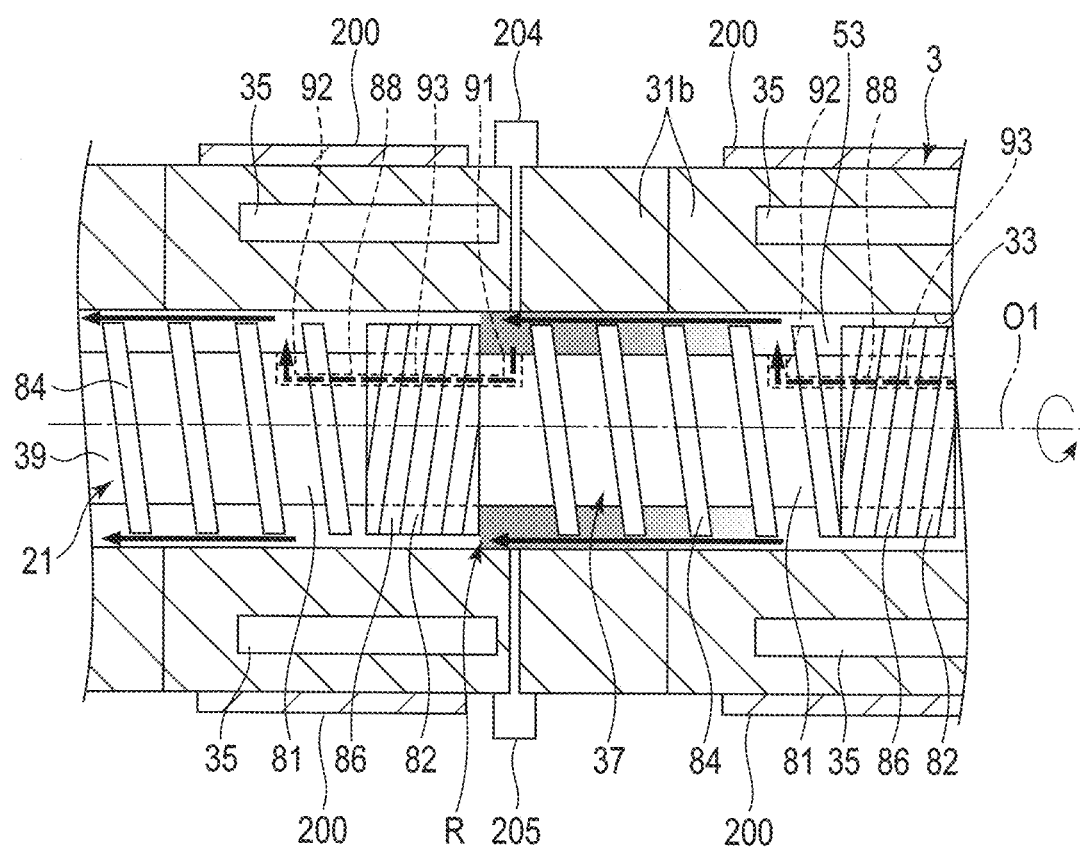
FIG. 17 is a cross-sectional view showing the second extruder of the second embodiment, schematically illustrating the direction of flow of the raw material at rotation of the screw.

As shown in FIG. 12, FIG. 13 and FIG. 17, each of the passages 88 includes an inlet 91, an outlet 92, and a passage body 93 which makes the inlet 91 and the outlet 92 communicate with each other. The inlet 91 and the outlet 92 are provided to be close to both sides of one barrier portion 82. In the other recognition, at one conveying portion 81 adjacent between two adjacent barrier portions 82, the inlet 91 is opened on the outer peripheral surface in the vicinity of the downstream end of the conveying portion 81 and the outlet 92 is opened on the outer peripheral surface in the vicinity of the upstream end of the conveying portion 81.

The passage body 93 extends straight in the axial direction of the screw body 37 without being branched in the middle. For example, the passage body 93 extending parallel to the axis O1 is illustrated in the drawings. Both sides of the passage body 93 are closed in the axial direction.

The inlet 91 is provided on one side of the passage body 93, i.e., the portion closer to the proximal end of the screw body 37. In this case, the inlet 91 may be opened to the outer peripheral surface of the screw body 37 from the one side end surface of the passage body 93 or may be opened to the outer peripheral surface of the screw body 37 from the portion closer to one side end surface of the passage body 93, i.e., the portion in front of the end surface. The opening direction of the inlet 91 is not limited to the direction orthogonal to the axis O1 but may be a direction intersecting the axis O1. In this case, the passage body 93 may be opened from one side in a plurality of directions and a plurality of inlets 91 may be thereby provided.

The outlet 92 is provided on the other side (i.e., the side opposite to one side) of the passage body 93, i.e., the portion closer to the distal end of the screw body 37. In this case, the outlet 92 may be opened from the end face of the other side of the passage body 93 to the outer peripheral surface of the screw body 37 or, the portion closer to the other side end surface of the passage body 93, i.e. the front end face it may be caused to open from the portion on the outer peripheral surface of the screw body 37. The opening direction of the outlet 92 is not limited to the direction orthogonal to the axis O1 but may be a direction intersecting the axis O1. In this case, the passage body 93 may be opened from one side in a plurality of directions and a plurality of outlets 92 may be thereby provided.

The passage body 93 connecting the inlet 91 and the outlet 92 crosses the barrier portion 82 for each unit explained above, and has a length extending across two conveying portions 81 sandwiching the barrier portion 82. In this case, the diameter of the passage body 93 may be set to be smaller than or equal to the diameter of the inlet 91 and outlet 92. In either of the cases, the passage cross-sectional area defined by the diameter of the passage body 93 is set to be much smaller than the annular cross-sectional area of the annular conveying path 53 in the radial direction.

In the present embodiment, when the screw 21 is disassembled by removing a plurality of tubular bodies 39 on which the flights 84 and 86 are formed from the rotary axis 38, the tubular bodies 39 on which at least several parts of the flights 84 and 86 are formed may be referred to as the screw elements explained above.

Then, the screw body 37 of the screw 21 can be configured by sequentially arranging a plurality of tubular bodies 39 as screw elements, on the outer periphery of the rotary shaft 38. For this reason, for example, the exchange and recombination of the conveying portion 81 and the barrier portion 82 can be executed in accordance with the degree of kneading of the raw material, and the work of exchange and recombination can easily be executed.

Furthermore, the passage bodies 93 of the passages 88 are formed and the inlets 91 and the outlets 92 of the passages 88 are made to integrally communicate with each other through the passage bodies 93, by tightening a plurality of tubular bodies 39 in the axial direction of the second shaft portion 41 and bringing the end faces of the adjacent tubular bodies 39 into close contact with each other. For this reason, when the passages 88 are formed in the screw body 37, each of the tubular bodies 39 having a length much shorter than the entire length of the screw body 37 may be processed. Thus, the workability and handling upon forming the passages 88 are easily improved.

According to the high-shearing processing apparatus 1 thus configured, the first extruder 2 preliminarily kneads a plurality of resins. The resins molten by the kneading become the raw material having fluidity and are continuously fed from the first extruder 2 to the conveyance path 53 through the feed port 34 of the second extruder 3.

The raw material fed to the second extruder 3 is introduced into the outer peripheral surface of the conveying portion 81 located on the side of the proximal end of the screw body 37 as represented by arrow C in FIG. 16. At this time, when the screw 21 is rotated counterclockwise as seen from the proximal end of the screw body 37, the flight 84 of the conveying portion 81 continuously conveys the raw material toward the distal end of the screw body 37 as represented by an arrow of a solid line in FIG. 16.

At this time, the shearing action generated based on the velocity difference between the flight 84 rotated along the conveyance path 53 and the inner peripheral surface of the cylinder portion 33 is imparted to the raw material, and the raw material is stirred by the subtle degree of twisting of the flight 84. As a result, the raw material is completely kneaded and dispersion of the polymeric component of the raw material proceeds.

The raw material having received the shearing action reaches the boundary between the conveying portion 81 and the barrier portion 82 along the conveyance path 53. The flight 86 of the barrier portion 82 is twisted to the left direction so as to convey the raw material from the proximal end to the distal end of the screw body 37 when the screw 21 is rotated counterclockwise. As a result, the conveyance of the raw material is blocked by the flight 86. In other words, when the screw 21 is rotated counterclockwise, the flight 86 of the barrier portion 82 prevents the raw material from passing through the clearance between the barrier portion 82 and the inner peripheral surface of the cylinder portion 33 by limiting the flow of the raw material conveyed by the flight 84.

At this time, the pressure of the raw material is increased at the boundary between the conveying portion 81 and the barrier portion 82. More specifically, a filling rate of the raw material at the part corresponding to the conveying portion 81 of the screw body 37, of the conveyance path 53, is represented with gradations in FIG. 17. In other words, the filling rate of the raw material is higher as the tone becomes darker, in the transport path 53. As apparent from FIG. 17, the filling rate of the raw material is higher at a position closer to the barrier portion 82, in the conveyance path 53 corresponding to the conveying portion 81, and the filling rate of the raw material is 100% just in front of the barrier portion 82.

For this reason, "raw material reservoir R" in which the filling rate of the raw material is 100% formed just in front of the barrier portion 82. In the raw material receiver R, the flow of the raw material is stopped and, thus, the pressure on the raw material is increased. The raw material having the pressure increased continuously flows into the passage body 93 from the inlet 91 opened in the outer peripheral surface of the conveying portion 81 and continuously flows from the proximal end toward the distal end of the screw body 37 in the passage body 93, as represented by an arrow of a broken line in FIG. 16 and FIG. 17.

As explained above, the passage cross-sectional area defined by the diameter of the passage body 93 is much smaller than the annular cross-sectional area of the conveyance path 53 along the radial direction of the cylinder portion 33. In the other recognition, a spread region based on the diameter of the passage body 93 is much smaller than a spread region of the annular conveyance path 53. For this reason, when the raw material flows from the inlet 91 into the passage body 93, the raw material is narrowed sharply and an extension action is thereby imparted to the raw material.

Furthermore, since the passage cross-cross-cross-sectional area is sufficiently smaller than the annular cross-cross-cross-sectional area, the raw material collected in the raw material receiver R does not disappear. That is, part of the raw material collected in the raw material reservoir R continuously flows into the inlet 91. During this time, a new raw material is fed toward the barrier portion 82 by the flight 84. As a result, the filling rate in the raw material reservoir R just in front of the barrier portion 82 is maintained at 100% at any time. At this time, even if some variation occurs in the amount of conveyance of the raw material conveyed by the flight 84, the variation state is absorbed by the raw material remaining in the raw material reservoir R. The raw material can be thereby fed to the passage 88 continuously and stably.

The extension action can be therefore continuously imparted to the raw material without interruption, in the passage 88.

The raw material which has passed through the passage body 93 flows out from the outlet 92 as represented by an arrow of a solid line in FIG. 17. The raw material is thereby continuously fed back onto the outer peripheral surface of the other conveying portion 81 adjacent to the barrier portion 82, on the distal end side of the screw body 37. The raw material fed back is continuously conveyed in the direction of the distal end of the screw body 37 by the flight 84 of the other conveying portion 81 and receives the shearing action again during the conveyance. The raw material having received the shearing action continuously flows into the passage body 93 from the inlet 91 and receives the extension action again during flowing through the passage body 93.

In the present embodiment, a plurality of conveying portions 81 and a plurality of barrier portions 82 are alternately arranged in the axial direction of the screw body 37, and a plurality of passages 88 are arranged in the axial direction of the screw body 37 so as to be spaced apart at intervals. For this reason, the raw material introduced into the screw body 37 from the feed port 34 is continuously conveyed from the proximal end to the distal end of the screw body 37 while alternately subjected to the shearing action and the extension action, as represented by the arrows in FIG. 16 and FIG. 17. Therefore, the degree of kneading of the raw material is increased and dispersion of the polymeric component of the raw material is promoted.

The raw material which has reached the distal end of the screw body 37 becomes the sufficiently kneaded material and continuously fed to the third extruder 4 from the discharge port 36a, and gaseous substances and other volatile components contained in the kneaded material are continuously removed from the kneaded material.

According to the second embodiment, not the apparently continuous production, but completely continuous production of the kneaded material can be executed. That is, since the resin preliminarily kneaded in the first extruder 2 is continuously fed to the second extruder 3 without interruption, the resin flow is not temporarily stopped inside the first extruder 2. For this reason, the temperature variation, viscosity variation or phase change of the resin which occur due to the kneaded resin retained inside the first extruder 2 can be thereby prevented. As a result, the raw material of a constantly uniform quality can be fed from the first extruder 2 to the second extruder 3.

Furthermore, according to the second embodiment, axial lengths of a shearing action region and an extension action region of the raw material can be set individually. For this reason, the number of times of impartment and the time of impartment of the shearing action and the extension action optimum to knead the raw material can be set.

Furthermore, according to the second embodiment, the passages 88 revolve around the axis O1 since the passages 88 imparting the extension action to the raw material extend in the axial direction of the screw body 37, at the positions eccentric to the axis O1 which is a center of rotation of the screw body 37. In other words, tubular wall surfaces 89 defining the passages 88 revolve around the axis O1 without rotating about the axis O1.

For this reason, the raw material is not actively stirred in the passages 88 when the raw material passes through the passages 88. Therefore, the raw material passing through the passages 88 can hardly receive the shearing action and the raw material fed back to the outer peripheral surface of the conveying portion 81 through the passages 88 mainly receives the extension action. Therefore, in the screw 21 of the second embodiment, too, the position at which the shearing action is imparted to the raw material and the position at which the extension action is imparted to the raw material can be clearly determined.

A result of a high dispersion confirmation test for the kneaded material in a case where the raw material is kneaded by alternately imparting the shearing action and the extension action in the completely continuous production will be explained.

In the test, two types of materials, i.e., polycarbonate resin (PC) and polymethyl methacrylate resin (PMMA) were fed to the first extruder 2 having an effective length (L/D) of the kneading portion 12 set at 7.9 with respect to the screw effective length (L/D), and a material in a molten state was produced by kneading the materials. Then, the material in the molten state was continuously fed from the first extruder 2 to a second extruder 3 as a raw material of the second extruder 3.

In the test, the screw 21 was configured so as to urge the shearing and extending operations to be repeated at eight times. Then, the specifications of the screw 21 were set as follows. That is, the screw diameter was set at 36 mm, the screw effective length (L/D) was set at 16.7, the number of revolutions of the screw was set at 2300 rpm, the raw material supply amount was set at 10.0 kg/h, and the barrel set temperature was set at 240° C.

According to this test, the intended transparent kneaded materials were continuously obtained.

Furthermore, in the screw 21 of the present embodiment, if one barrier portion 82, two conveying portions 81 adjacent to both sides of the barrier portion, and at least one passage 88 formed to extend from the conveying portions 81 to the barrier portion 82 are handled as one unit, the units are provided in the axial direction (longitudinal direction of the screw 21) under a certain rule.

This unit can be regarded as "screw element" having a constant length in the axial direction as a minimum unit for kneading the raw material. In the screw 21 of the present embodiment, the "screw elements" are disposed in the axial direction at regular intervals.

Accordingly, various conditions occurring at each "screw element", for example, "pressure rise", "temperature rise" associated with the pressure increase, and the like appear at regular intervals in the axial direction of the screw 21. The "pressure rise" remarkably appears at, for example, the portion (raw material reservoir R) at which the raw material conveyed by the conveying portions 81 is blocked by the barrier portions 82, and the position of the "raw material reservoir R" appears with regular intervals in the axial direction of the screw 21.

Furthermore, each "screw element" comprises the portion (conveying section 81) which imparts the shearing action to the raw material and the portion (passage 88) which imparts the extension action to the raw material, and these portions are also formed with regular intervals in the axial direction of the screw 21.

In the present embodiment, each middle barrel block 31b other than the barrel blocks 31a and 31c on both sides of the barrel 20, of a plurality of barrels blocks 31a, 31b and 31c as described above, is configured to correspond to the length of each "screw element" in the length direction of the screw 21. In this case, the length of the barrel block 31b may be set to an integral multiple of the length of the "screw element" or may be set to a fraction of an integer. Furthermore, the length of the barrel block 31b may be set to be equal to the length of the "screw element".

An example of the configuration of the screw 21 in which the length of the barrel block 31b is set, configuration of the screw 21 is set to be equal to the length of the "screw element" is illustrated. That is, one of the "screw elements" is made to correspond within the range of the length of one barrel block 31b. More specifically, the length of one barrel block 31b is set to be within a range including at least the inlets 91 and the outlets 92 of the passages 88, of the conveying portions 81 adjacent to both sides of the barrier portion 82, in one "screw element".

For example, if providing three "screw elements" under a certain rule, i.e., with regular intervals in the axial direction (longitudinal direction of the screw 21) is assumed, three "screw elements" are arranged in the axial direction.

At this time, to constitute the cylinder portion 33 in which the screw 21 is inserted to be rotatable, in the barrel 20, three barrels blocks 31b may be interposed between the barrel block 31a and 31c disposed on both ends and may be integrated with each other by the connecting rod 201 in this state.

The barrel 20 thereby has a barrel structure considering the rule of three "screw elements". At this time, a positional relationship of one of the barrel blocks 31b opposed to one "screw element" is formed in a state in which the screw 21 is inserted into the cylinder portion 33 of the barrel 20 so as to be rotatable.

According to this configuration, when the raw material is kneaded by rotating the screw 21, various states occurring for each of the "screw elements" (for example, pressure rise, temperature rise and raw material reservoir R) are defined at specific positions in the longitudinal direction of the screw 21, in each of the barrel blocks 31b.

For example, if a state in which the raw material conveyed by the conveying portion 81 is blocked by the barrier portion 55 is assumed, the state "raw material reservoir R" appears at the boundary between the conveying portion 81 and the barrier portion 82. Furthermore, the state called "pressure rise" or "temperature rise" appears at the boundary between the conveying portion 81 and the barrier portion 82 by the increased pressure of the raw material.

Such various states (pressure rise, temperature rise, and raw material reservoir R) appear at constant positions at any time in the longitudinal direction of the screw 21 in each of the "screw elements". Thus, various states (pressure rise, temperature rise, and raw material reservoir R) are, inevitably, defined at specific positions at any time, in the longitudinal direction of the screw 21 of each barrel block 31b in each barrel block 31b in a positional relationship of being opposed to each of "screw elements".

Therefore, variation in pressure and temperature occurring during kneading the raw material can be measured directly in real time, by disposing, for example, the temperature sensor 204 and the pressure sensor 205 at the "specific positions". Then, the temperature of the barrel 20 can be maintained in a state optimum for kneading the raw material, by executing ON/OFF control of the heater 200 and the flow control of the refrigerant to the refrigerant passage 35, based on the measurement results.

The "specific positions" can be preliminarily recognized for each of the barrel block 31b. Therefore, attachment holes (not shown) for attachment of the measurement elements can be preliminarily formed at, for example, the manufacturing stage of the barrel blocks 31b. Various states occurring for each of the screw elements can be thereby measured directly in real time, by only attaching the measurement elements at the "specific positions".

An example of the barrel block 31b in which temperature sensors 204 and pressure sensors 205 are disposed to be opposed to the inlets 91 of the passages 88 and in which heaters 200 and refrigerant passages 35 are disposed to be opposed to the range including the inlets 91 and the outlets 92 of the passages 88, is illustrated in the drawings, but this is merely an example and they can be freely disposed within each of the "screw elements".

In addition, since the advantages and important points resulting from the above-described structure are the same as those of the first embodiment, their explanations are omitted.

Third Embodiment

FIG. 18 to FIG. 26 disclose a third embodiment. The third embodiment is different from the first embodiment with respect to matters concerning a screw body 37. The structure of a screw 21 other than this is basically the same as that in the first embodiment. For this reason, elements in the third embodiment similar to those of the first embodiment are denoted by like reference numerals and their detailed descriptions are omitted.

Figure 18:
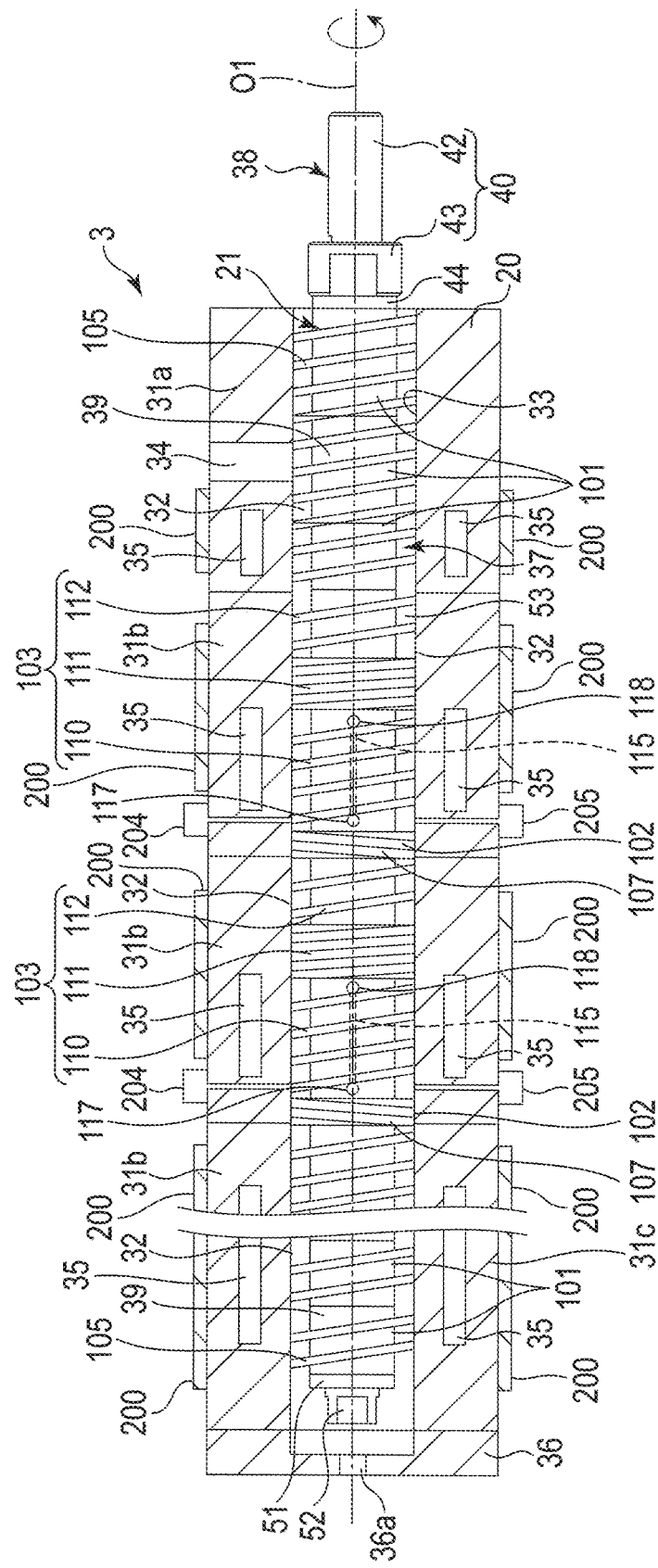
FIG. 18 is a cross-sectional view showing a second extruder used in a third embodiment.

As shown in FIG. 18 and FIG. 19, a plurality of cylindrical tubular bodies 39 constituting a screw body 37 are tightened between a first collar 44 and a second collar 51 in the axial direction of a second shaft portion 41 such that end faces of the adjacent tubular body 39 are in close contact with each other without a gap, similarly to the first embodiment.

At this time, all the tubular bodies 39 are coaxially coupled on the second shaft portion 41, and each of the tubular bodies 39 and a rotary shaft 38 are in the state of being assembled integrally. Accordingly, each of the tubular bodies 39 can be rotated about the axis O1 together with the rotary shaft 38, i.e., the screw body 37 can be rotated about the axis O1.

In this state, each of the tubular bodies 39 is a component which defines an outer diameter D1 (see FIG. 21) of the screw body 37. In other words, the outer diameters D1 of the respective tubular bodies 39 which are coaxially coupled along the second axis portion 41 are set to be equal to each other. The outer diameter D1 of the screw body 37 (each tubular body 39) is the diameter defined through the axis O1 which is the center of rotation of the rotary shaft 38.

The segment-type screw 21 in which the outer diameter D1 of the screw body 37 (each tubular body 39) is a constant value is thereby constituted. The segment-type screw 21 can allow a plurality of screw elements to be held in free order and combination along the rotary axis 38 (i.e., the second shaft portion 41). As for the screw element, for example, the tubular body 39 on which at least several parts of flights 105, 107, 110, 111 and 112 to be explained later are formed can be defined as a screw element.

Thus, convenience in, for example, change or adjustment of specifications or maintenance, of the screw 21, can be remarkably improved by segmenting the screw 21.

Furthermore, the segment-type screw 21 is coaxially accommodated in a cylinder portion 33 of a barrel 20. More specifically, the screw body 37 in which a plurality of screw elements are held along the rotary shaft 38 (second shaft portion 41) is accommodated in the cylinder portion 33 so as to be rotatable. In this state, a first shaft portion 40 (joint portion 42 and stopper portion 43) of the rotary shaft 38 protrudes from one end portion of the barrel 20 to the outside of the barrel 20.

Moreover, in this state, a conveyance path 53 for conveying the raw material is formed between the outer peripheral surface of the screw body 37 in the circumferential direction and the inner peripheral surface of the cylinder portion 33. The conveyance path 53 has an annular cross-section along the radial direction of the cylinder portion 33 and extends in the axial direction of the cylinder portion 33.

Figure 20:
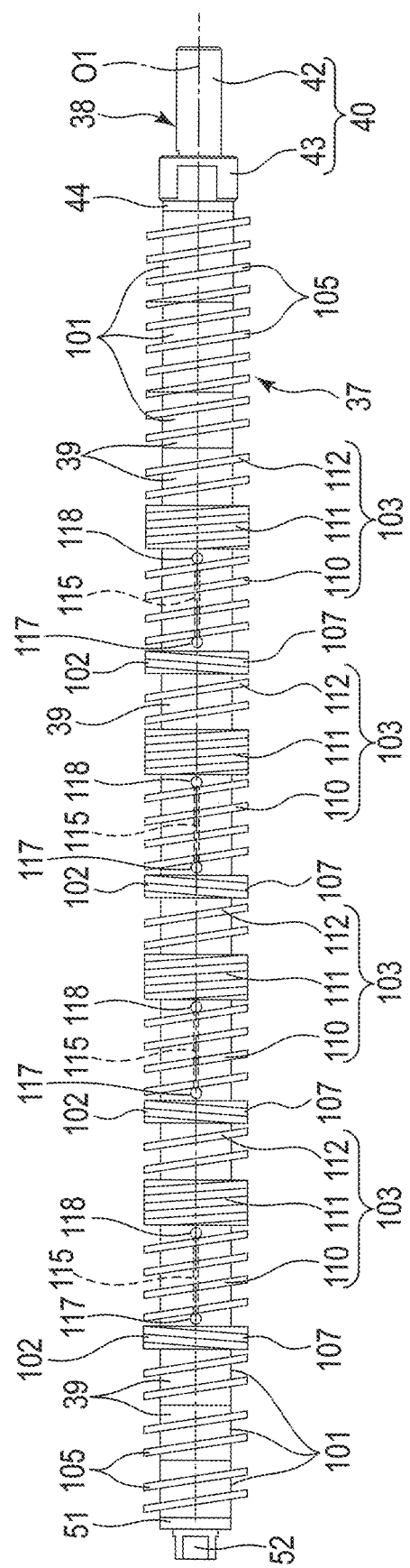
FIG. 20 is a side view showing the screw used in the third embodiment.

As shown in FIG. 18 to FIG. 20, the screw body 37 comprises a plurality of conveying portions 101 for conveying the raw material, a plurality of barrier portions 102 for restricting flow of the raw material, and a plurality of circulating portions 103 temporarily circulating the raw material. That is, the plurality of conveying portions 101 are disposed at the proximal end of the screw body 37 corresponding to one end portion of the barrel 20, and the plurality of conveying portions 101 are disposed at the distal end of the screw body 37 corresponding to the other end portion of the barrel 20. Furthermore, the circulating portions 103 and the barrier portions 102 are alternately disposed in the axial direction, from the proximal end toward the distal end of the screw body 37, between the conveying portions 101.

The feed port 34 of the barrel 20 is opened toward the conveying portion 54 disposed on the side of the proximal end of the screw body 37.

Each of the conveying portions 101 comprises a helically twisted flight 105. The flight 105 protrudes toward the conveyance path 53 from the outer peripheral surface of the tubular body 39 along the circumferential direction. The flight 105 is twisted so as to convey the raw material from the proximal end to the distal end of the screw body 37 when the screw 21 is rotated counterclockwise as seen from the proximal end of the screw body 37. In other words, the flight 105 is twisted clockwise such the same as that of a right-hand screw.

Each of the barrier portions 102 comprises a helically twisted flight 107. The flight 107 protrudes toward the conveyance path 53 from the outer peripheral surface of the tubular body 39 along the circumferential direction. The flight 107 is twisted so as to convey the raw material from the distal end to the proximal end of the screw body 37 when the screw 21 is rotated counterclockwise as seen from the proximal end of the screw body 37. In other words, the flights 107 are twisted counterclockwise such the same as that of a left-hand screw.

The circulating portions 103 are adjacent to the barrier portions 102 from the side of the proximal end of the rotary axis 38. Each of the circular portions 103 comprises first to third helically twisted flights 110, 111 and 112. Each of the first to third flights 110, 111 and 112 protrudes toward the conveyance path 53 from the outer peripheral surface of the tubular body 39 along the circumferential direction.

The first to third flights 110, 111 and 112 are continuously disposed in the axial direction of the screw body 37. The flights are twisted so as to convey the raw material from the proximal end to the distal end of the screw body 37 when the screw 21 is rotated counterclockwise as seen from the proximal end of the screw body 37. In other words, the first to third flights 110, 111 and 112 are twisted clockwise such the same as that of a right-hand screw.

In this case, a twist pitch of the flight 107 of each of the barrier portions 102 is set to be equal to or smaller than twist pitches of the flights 105 of the conveying portions 101 and the flights 110, 111 and 112 of the circulating portions 103. Furthermore, the twist pitch of the second flight 111 is set to be smaller than the twist pitches of the first and third flights 110 and 112. Furthermore, a slight clearance is ensured between top portions of the flights 105, 107, 110, 111 and 112 and the inner peripheral surface of the cylinder portion 33.

Furthermore, in the first to third flights 110, 111 and 112, the third flight 112 is disposed on the upstream side of the conveying direction while the first flight 110 is disposed on the downstream side of the conveying direction. The second flight 111 is disposed between the third flight 112 and the first flight 110.

In the present embodiment, each of the barrier portions 102 is designed such that the raw material flows over the barrier portion 102. More specifically, each barrier portion 102 is designed such that the raw material can pass between the barrier portion 102 and the cylinder portion 33 in a state in which the screw 21 is inserted into the cylinder portion 33 of the barrel 20 so as to be rotatable. In this case, the clearance between an outer diameter portion of the barrier portion 102 (the top portion of the flight 107) and the inner peripheral surface of the cylinder portion 33 is desirably set in a range between 0.1 mm or more and 3 mm or less. More desirably, the clearance is set in the range between 0.1 mm or more and 1.5 mm or less.

The length of the conveying portions 101 in the axial direction of the screw body 37 is arbitrarily set in accordance with, for example, the type of the raw material, the degree of kneading of the raw material, the volume of production of the kneaded material per unit time, and the like. The conveyance portions 101 are regions where the flights 105 are formed at least on the outer peripheral surfaces of the cylindrical members 39 but are not limited to regions between the start and end points of flights 105.

In other words, regions displaced from the flights 105, on the outer peripheral surface of the cylindrical body 39, may also be considered as the conveying portions 101. For example, if a cylindrical spacer or a cylindrical collar is disposed at a position adjacent to the cylindrical body 39 comprising the flights 105, the spacer or the collar may also be included in the conveyance portions 101.

Furthermore, the length of each barrier portion 102 of the screw body 37 in the axial direction is arbitrarily set in accordance with, for example, the type of the raw material, the degree of kneading of the raw material, the volume of production of the kneaded material per unit time, and the like. The barrier portions 102 of the present embodiment function to block the flow of the raw material fed by the conveying portions 101 and to urge part of the raw material to flow over the barrier portions 102.

Furthermore, each of the flights 105, 107, 110, 111 and 112 protrudes toward the conveyance path 53 from the outer peripheral surface of the plurality of tubular bodies 39 having the same outer diameter D1, in the screw 21. For this reason, the outer peripheral surface of each tubular body 39 in the circumferential direction defines a root diameter of the screw 21. The root diameter of the screw 21 is kept constant along the entire length of the screw 21.

As shown in FIG. 18 to FIG. 20, the screw body 37 comprises a plurality of passages 115 extending in the axial direction of the screw body 37. The passages 115 are formed on the tubular bodies 39 of the circular portions 103, respectively. In this case, the passages 115 are aligned in the same straight line along the axial direction of the screw body 37 so as to be spaced apart at predetermined intervals (for example, regular intervals).

Furthermore, the passages 115 are provided at positions eccentric from the axis O1 of the rotary shaft 38, inside the tubular bodies 39. In other words, the passages 115 are displaced from the axis O1 and revolve about the axis O1 when the screw body 37 is rotated.

As shown in FIG. 21, the passage 115 is, for example, a hole having a circular cross-section. An inner diameter of the hole is set at, for example, 1 mm or more and less than 6 mm, preferably, 1 mm or more and less than 5 mm. Furthermore, the tubular body 39 of the circulating portion 103 includes a tubular wall surface 116 which define the hole. That is, the passage 115 is the hole formed of hollow space alone, and the wall surface 116 continuously surrounds the hollow passage 115 in the circumferential direction. The passage 115 is thereby configured as the hollow space which allows the only flow of the raw material. In other words, the other elements forming the screw body 37 do not exist inside the passage 115. Furthermore, the wall surface 116 revolves about the axis O1 without rotating about the axis O1 when the screw body 37 is rotated.

Figure 26:
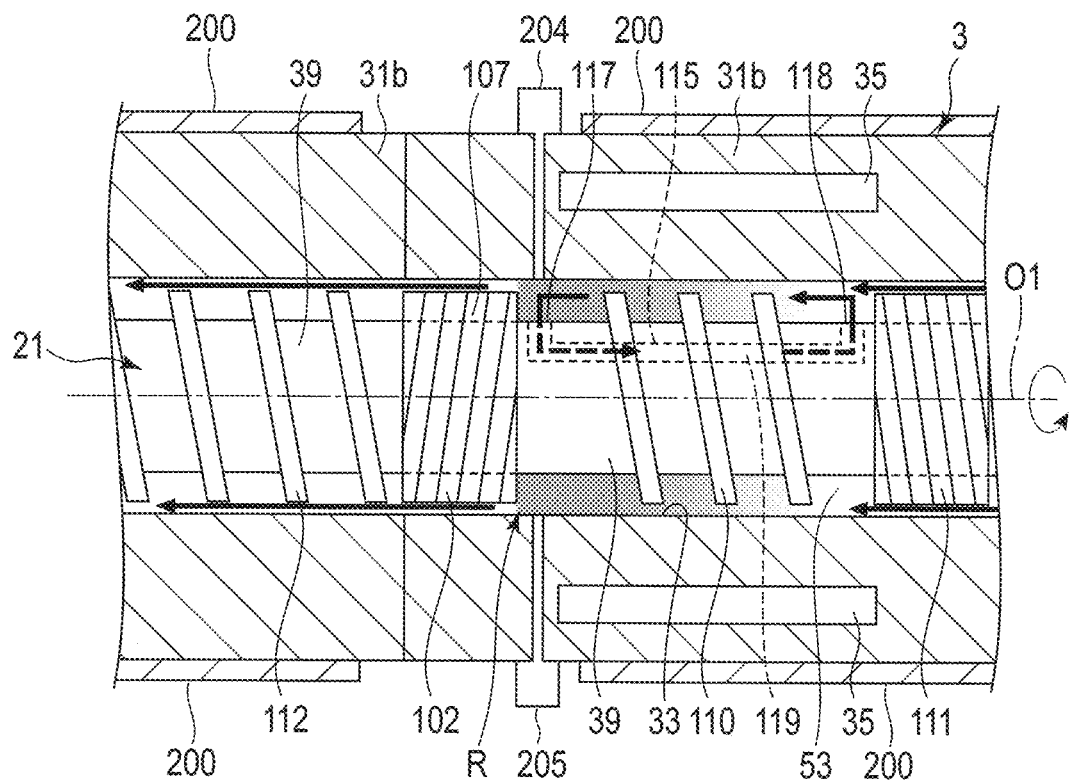
FIG. 26 is a cross-sectional view showing the second extruder of the third embodiment, schematically illustrating the direction of flow of the raw material at rotation of the screw.

As shown in FIG. 18, FIG. 19 and FIG. 26, each of the passages 115 includes an inlet 117, an outlet 118, and a passage body 119 which makes the inlet 117 and the outlet 118 communicate with each other. The inlet 117 and the outlet 118 are opened toward the outer peripheral surface of the tubular body 39 constituting the circular portion 103. An example of the passage 115 is illustrated in the drawings. In the passage 115, the passage body 119 is provided on the tubular body 39 on which the first flight 110 is formed, and the inlet 117 and the outlet 118 are opened toward the outer peripheral surface of the tubular body 39. The opening positions of the inlet 117 and the outlet 118 can be freely set within a range of the outer peripheral surface of the tubular body 39.

The passage body 119 extends straight in the axial direction of the screw body 37 without being branched in the middle. For example, the passage body 119 extending parallel to the axis O1 is illustrated in the drawings. Both sides of the passage body 119 are closed in the axial direction.

The inlet 117 is provided on one side of the passage body 93, i.e., the portion closer to the distal end of the screw body 37. In this case, the inlet 117 may be opened to the outer peripheral surface of the screw body 37 from the one side end surface of the passage body 119 or may be opened to the outer peripheral surface of the screw body 37 from the portion closer to one side end surface of the passage body 119, i.e., the portion in front of the end surface. The opening direction of the inlet 117 is not limited to the direction orthogonal to the axis O1 but may be a direction intersecting the axis O1. In this case, the passage body 119 may be opened from one side in a plurality of directions and a plurality of inlets 117 may be thereby provided.

The outlet 118 is provided on the other side (i.e., the side opposite to one side) of the passage body 119, i.e., the portion closer to the proximal end of the screw body 37. In this case, the outlet 118 may be opened from the end face of the other side of the passage body 119 to the outer peripheral surface of the screw body 37 or, the portion closer to the other side end surface of the passage body 119, i.e. the front end face it may be caused to open from the portion on the outer peripheral surface of the screw body 37. The opening direction of the outlet 118 is not limited to the direction orthogonal to the axis O1 but may be a direction intersecting the axis O1. In this case, the passage body 119 may be opened from one side in a plurality of directions and a plurality of outlets 118 may be thereby provided.

The passage body 119 connecting the inlet 117 and the outlet 118 has a length extending across the tubular body 39 on which the first flight 110 is formed, at each circular portion 103. In this case, the diameter of the passage body 119 may be set to be smaller than or equal to the diameter of the inlet 117 and outlet 118. In either of the cases, the passage cross-sectional area defined by the diameter of the passage body 119 is set to be much smaller than the annular cross-sectional area of the annular conveying path 53 in the radial direction.

In the present embodiment, when the screw 21 is disassembled by removing a plurality of tubular bodies 39 on which the flights 105, 107, 110, 111 and 112 are formed from the rotary axis 38, the tubular bodies 39 on which at least several parts of the flights 105, 107, 110, 111 and 112 are formed may be referred to as the screw elements explained above.

Then, the screw body 37 of the screw 21 can be configured by sequentially arranging a plurality of tubular bodies 39 as screw elements, on the outer periphery of the rotary shaft 38. For this reason, for example, the exchange and recombination of the conveying portion 101 and the barrier portion 102 can be executed in accordance with the degree of kneading of the raw material, and the work of exchange and recombination can easily be executed.

Furthermore, the passage bodies 119 of the passages 115 are formed and the inlets 117 and the outlets 118 of the passages 115 are made to integrally communicate with each other through the passage bodies 119, by tightening a plurality of tubular bodies 39 in the axial direction of the second shaft portion 41 and bringing the end faces of the adjacent tubular bodies 39 into close contact with each other. For this reason, when the passages 115 are formed in the screw body 37, each of the tubular bodies 39 having a length much shorter than the entire length of the screw body 37 may be processed. Thus, the workability and handling upon forming the passages 115 are easily improved.

Figure 23:
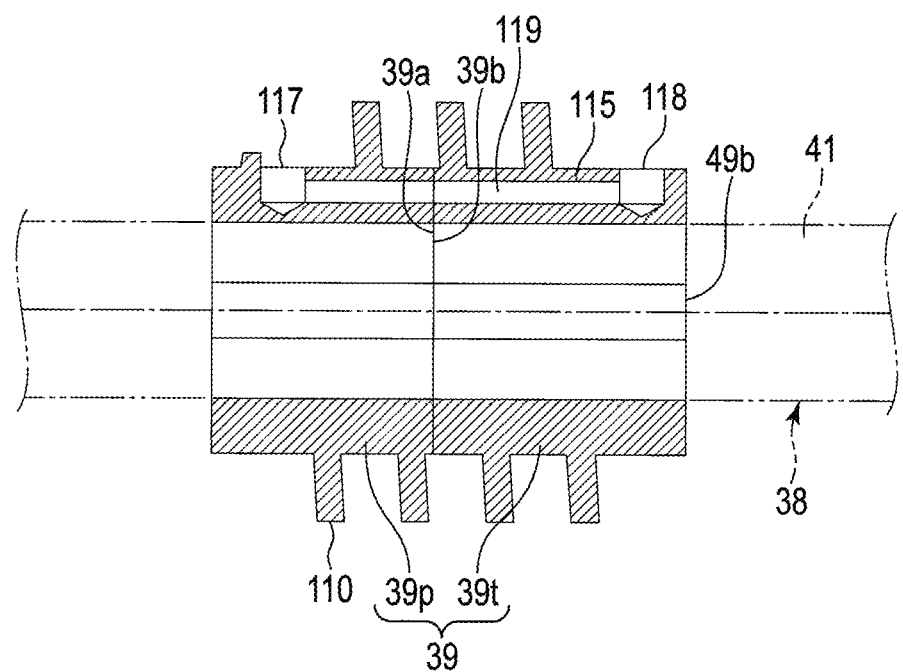
FIG. 23 is a transverse cross-sectional view showing the tubular body in FIG. 22.

As shown in FIG. 22 and FIG. 23, the tubular body 39 on which the first flight 110 is formed is divided into two parts to cut the passage body 119 of the passage 115. On a tubular body 39t, a lateral hole formed in the axial direction from a division surface 39a communicates with the outlet 118. On the other tubular body 39p, a lateral hole formed in the axial direction from a division surface 39b communicates with the outlet 117. In this structure, the serial passage 115 having both sides opened to the outer peripheral surface of the tubular body 39 is formed by urging the division surfaces 39a and 39b to abut on each other.

Figure 24:
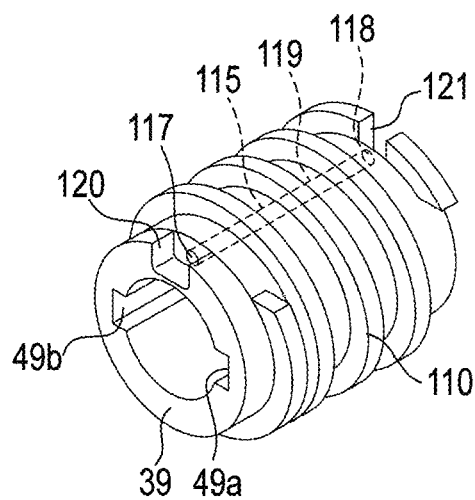
FIG. 24 is a perspective view showing another configuration example of the tubular body used in the third embodiment.

As for the other passage 115, a hole may be formed to penetrate the tubular body 39 of the first flight 110 in the axial direction as shown in, for example, FIG. 24. In this case, the inlet 117 and the outlet 118 of the passage 115 are opened to an inlet groove 120 and an outlet groove 121 formed by partially cutting away both axial end surfaces of the tubular body 39 in a recess shape. In this structure, the serial passage 115 can be formed by only urging the lateral hole to penetrate the tubular body 39 without dividing the tubular body 39.

According to the high-shearing processing apparatus 1 thus configured, the first extruder 2 preliminarily kneads a plurality of resins. The resins molten by the kneading become the raw material having fluidity and are continuously fed from the first extruder 2 to the conveyance path 53 through the feed port 34 of the second extruder 3.

Figure 25:
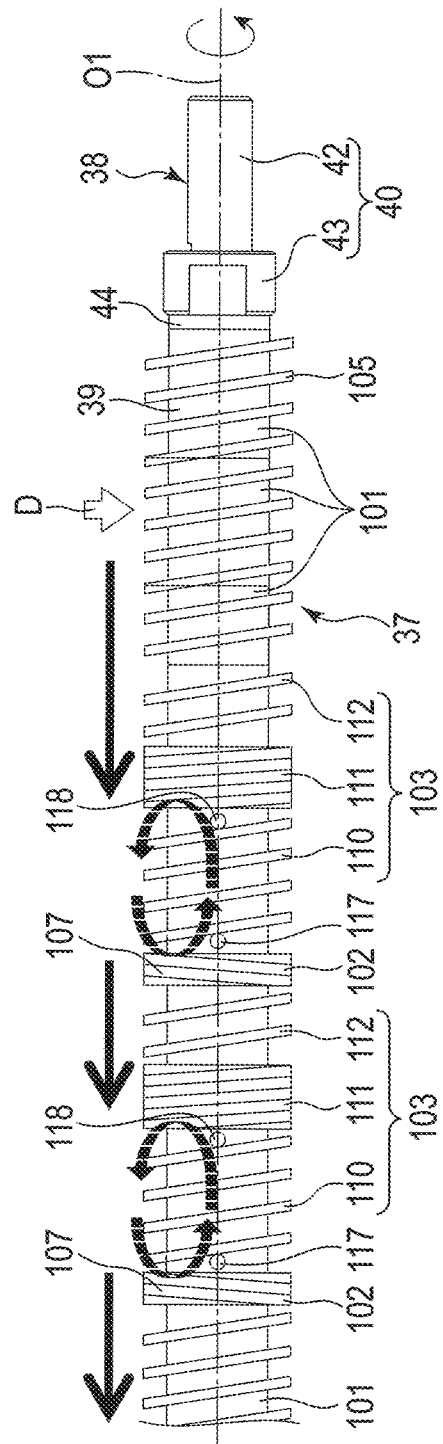
FIG. 25 is a side view showing a direction of flow of a raw material with respect to the screw in the third embodiment.

The raw material fed to the second extruder 3 is introduced into the outer peripheral surface of the conveying portion 101 located on the side of the proximal end of the screw body 37 as represented by arrow D in FIG. 25. At this time, when the screw 21 is rotated counterclockwise as seen from the proximal end of the screw body 37, the flight 105 of the conveying portion 101 continuously conveys the raw material toward the distal end of the screw body 37 as represented by an arrow of a solid line in FIG. 25.

After this, the raw material which has reached the circular portion 103 is further conveyed continuously toward the distal end of the screw body 37, by the first to third flights 110, 111 and 112 of the circular portion 103, as represented by an arrow of a solid line in FIG. 25 and FIG. 26.

During this time, the shearing action generated based on the velocity difference between the flights 105, 110, 111 and 112 rotated along the conveyance path 53 and the inner peripheral surface of the cylinder portion 33 is imparted to the raw material, and the raw material is stirred by the subtle degree of twisting of the flights 105, 110, 111 and 112. As a result, the raw material is completely kneaded and dispersion of the polymeric component of the raw material proceeds.

The raw material having received the shearing action reaches the boundary between the circular portion 103 and the barrier portion 102 along the conveyance path 53. In other words, the raw material is fed to the boundary between the circular portion 103 and the barrier portion 102 by the first flight 110 disposed on the downstream side of the conveying direction. In contrast, the flight 107 of the barrier portion 102 conveys the raw material from the distal end to the proximal end of the screw body 37 when the screw 21 is rotated counterclockwise.

As a result, the raw material fed by the first flight 110 is blocked by the flight 107. In other words, the flight 107 of the barrier portion 102 restricts the flow of the raw material fed by the first flight 110 when the screw 21 is rotated counterclockwise.

At this time, the pressure of the raw material is increased at the boundary between the circular portion 103 and the barrier portion 102. More specifically, a filling rate of the raw material at the part corresponding to the passage 115, of the conveyance path 53, is represented with gradations in FIG. 26. In other words, the filling rate of the raw material is higher as the tone becomes darker, in the transport path 53. As apparent from FIG. 26, the filling rate of the raw material is higher at a position closer to the barrier portion 102, in the conveyance path 53 corresponding to the conveying portion 115, and the filling rate of the raw material is 100% just in front of the barrier portion 102.

For this reason, raw material reservoir R in which the filling rate of the raw material is 100% formed just in front of the barrier portion 102. In the raw material receiver R, the flow of the raw material is stopped and, thus, the pressure on the raw material is increased. The raw material having the pressure increased continuously flows into the passage body 119 from the inlet 117 and continuously flows from the distal end toward the proximal end of the screw body 37 in the passage body 119, as represented by an arrow of a broken line in FIG. 25 and FIG. 26. At this time, the direction of flow of the raw material in the passage body 119 is opposite to the direction of flow of the raw material fed by the flights 105, 110, 111 and 112.

As explained above, the passage cross-sectional area defined by the diameter of the passage body 64 is much smaller than the annular sectional area of the conveyance path 53 along the radial direction of the cylinder portion 33. In the other recognition, a spread region based on the diameter of the passage body 119 is much smaller than a spread region of the annular conveyance path 53. For this reason, when the raw material flows from the inlet 117 into the passage body 119, the raw material is narrowed sharply and an extension action is thereby imparted to the raw material.

Furthermore, since the passage cross-cross-cross-sectional area is sufficiently smaller than the annular cross-cross-cross-sectional area, the raw material collected in the raw material receiver R does not disappear. That is, part of the raw material collected in the raw material reservoir R continuously flows into the inlet 117. During this time, a new raw material is fed toward the barrier portion 102 by the first flight 110. As a result, the filling rate in the raw material reservoir R just in front of the barrier portion 102 is maintained at 100% at any time. At this time, even if some variation occurs in the amount of conveyance of the raw material conveyed by the first flight 110, the variation state is absorbed by the raw material remaining in the raw material reservoir R. The raw material can be thereby fed to the passage 115 continuously and stably. The extension action can be therefore continuously imparted to the raw material without interruption, in the passage 88.

The raw material which has passed through the passage body 119 flows out from the outlet 118 as represented by an arrow of a solid line in FIG. 26. The raw material is thereby continuously fed back onto the outer peripheral surface of the circulating portion 103. The raw material fed back is continuously conveyed toward the adjacent barrier portion 102 on a side of the distal end of the screw body 37 by the first flight 110 and receives the shearing action again during the conveyance.

In this case, a backflow preventing function can be imparted to the portion where the second flight 111 is formed, by setting the twist pitch of the second flight 111 to be smaller than the twist pitch of the first flight 110. The raw material fed back from the outlet 118 to the circulating portion 103 can be thereby conveyed toward the barrier portion 102 without leak.

In the present embodiment, part of the raw material conveyed toward the barrier portion 102 is continuously led again from the inlet 117 to the passage 115 and temporarily repeats circulating at a position of the circulating portion 103. The remaining raw material conveyed toward the barrier portion 102 passes through the clearance between the top portion of the flight 107 and the inner peripheral surface of the cylinder portion 33 and continuously flows to the adjacent circulating portion 103.

A plurality of barrier portions 102 and a plurality of circulating portions 103 are alternately arranged in the axial direction of the screw body 37, and the passages 115 provided at positions corresponding to the first flights 110 of the circulating portions 103 are arranged in the axial direction of the screw body 37 so as to be spaced apart at intervals. For this reason, the raw material fed from the feed port 34 to the screw body 37 is continuously conveyed from the proximal end to the distal end of the screw body 37 while alternately subjected to the shearing action and the extension action. Therefore, the degree of kneading of the raw material is increased and dispersion of the polymeric component of the raw material is promoted.

The raw material which has reached the distal end of the screw body 37 becomes the sufficiently kneaded material and continuously fed to the third extruder 4 from the discharge port 36a, and gaseous substances and other volatile components contained in the kneaded material are continuously removed from the kneaded material.

According to the third embodiment, not the apparently continuous production, but completely continuous production of the kneaded material can be executed. That is, since the resin preliminarily kneaded in the first extruder 2 is continuously fed to the second extruder 3 without interruption, the resin flow is not temporarily stopped inside the first extruder 2. For this reason, the temperature variation, viscosity variation or phase change of the resin which occur due to the kneaded resin retained inside the first extruder 2 can be thereby prevented. As a result, the raw material of a constantly uniform quality can be fed from the first extruder 2 to the second extruder 3.

Furthermore, according to the third embodiment, the shearing action and the extension action can be alternately imparted to the raw material at several times by the circulating portion 103 in which the passage 115 is formed. In this case, the number of times of imparting the shearing action and the extension action to the raw material can be further increased by arranging a plurality of circulating portions 103 in the axial direction.

Furthermore, according to the third embodiment, the passages 115 imparting the extension action to the raw material extend in the axial direction of the screw body 37, at the positions eccentric to the axis O1 which is a center of rotation of the screw body 37. The passages 115 therefore revolve around the axis O1. In other words, tubular wall surfaces 116 defining the passages 115 revolve around the axis O1 without rotating about the axis O1.

For this reason, the raw material is not actively stirred in the passages 115 when the raw material passes through the passages 115. Thus, the raw material passing through the passages 115 can hardly receive the shearing action and the raw material fed back to the outer peripheral surface of the conveying portion 103 through the passages 115 mainly receives the extension action. Therefore, in the screw 21 of the third embodiment, too, the position at which the shearing action is imparted to the raw material and the position at which the extension action is imparted to the raw material can be clearly determined.

A result of a high dispersion confirmation test for the kneaded material in a case where the raw material is kneaded by alternately imparting the shearing action and the extension action in the completely continuous production will be explained.

In the test, two types of materials, i.e., polycarbonate resin (PC) and polymethyl methacrylate resin (PMMA) were fed to the first extruder 2 having an effective length (L/D) of the kneading portion 12 set at 7.9 with respect to the screw effective length (L/D), and a material in a molten state was produced by kneading the materials. Then, the material in the molten state was continuously fed from the first extruder 2 to a second extruder 3 as a raw material of the second extruder 3.

In the test, the screw 21 was configured such that the above-described circulating portions 103 were disposed at three positions in the axial direction and the raw material was urged to pass through each of the passages 115. Then, the specifications of the screw 21 were set as follows. That is, the screw diameter was set at 36 mm, the screw effective length (L/D) was set at 16.7, the number of revolutions of the screw was set at 2500 rpm, the raw material supply amount was set at 10.0 kg/h, and the barrel set temperature was set at 240° C.

According to this test, the intended transparent kneaded materials were continuously obtained.

Furthermore, in the screw 21 of the present embodiment, if the circulating portion 103 (portion at which the first to third flights 110, 111 and 112 are formed) and the passage 115 provided at a portion of the first flight 110 are handled as one unit, the units are provided in the axial direction (longitudinal direction of the screw 21) under a certain rule.

This unit can be regarded as "screw element" having a constant length in the axial direction as a minimum unit for kneading the raw material. In the screw 21 of the present embodiment, the "screw elements" and the barrier portions 102 are disposed alternately. In other words, the "screw elements" are disposed at regular intervals through the barrier portions 102.

Accordingly, various conditions occurring at each "screw element", for example, "pressure rise", "temperature rise" associated with the pressure increase, and the like appear at regular intervals in the axial direction of the screw 21. The "pressure rise" remarkably appears at, for example, the portion (raw material reservoir R) at which the raw material conveyed by the first to third flights 110, 111 and 112 is blocked by the barrier portions 102, and the position of the "raw material reservoir R" appears with regular intervals in the axial direction of the screw 21.

Furthermore, each "screw element" comprises the portion which imparts the shearing action to the raw material (portions at which the first to third flights 110, 111 and 112 are formed) and the portion (passage 115) which imparts the extension action to the raw material, and these portions are also formed with regular intervals in the axial direction of the screw 21.

In the present embodiment, each middle barrel block 31b other than the barrel blocks 31a and 31c on both sides of the barrel 20, of a plurality of barrels blocks 31a, 31b and 31c as described above, is configured to correspond to the length of each "screw element" in the length direction of the screw 21. In this case, the length of the barrel block 31b may be set to an integral multiple of the length of the "screw element" or may be set to a fraction of an integer. Furthermore, the length of the barrel block 31b may be set to be equal to the length of the "screw element".

An example of the configuration of the screw 21 in which the length of the barrel block 31b is set, configuration of the screw 21 is set to be equal to the length of the "screw element" is illustrated. That is, one of the "screw elements" is made to correspond within the range of the length of one barrel block 31b. More specifically, the length of one barrel block 31b is set within a range including the portion at which the first to third flights 110, 111 and 112 are formed and the portion at which the flight 107 of the barrier portion 102 is formed, in one "screw element".

For example, if providing three "screw elements" under a certain rule, i.e., with regular intervals in the axial direction (longitudinal direction of the screw 21) is assumed, three "screw elements" are arranged in the axial direction.

At this time, to constitute the cylinder portion 33 in which the screw 21 is inserted to be rotatable, in the barrel 20, three barrels blocks 31b may be interposed between the barrel block 31a and 31c disposed on both ends and may be integrated with each other by the connecting rod 201 in this state.

The barrel 20 thereby has a barrel structure considering the rule of three "screw elements". At this time, a positional relationship of one of the barrel blocks 31b opposed to one "screw element" is formed in a state in which the screw 21 is inserted into the cylinder portion 33 of the barrel 20 so as to be rotatable.

According to this configuration, when the raw material is kneaded by rotating the screw 21, various states occurring for each of the "screw elements" (for example, pressure rise, temperature rise and raw material reservoir R) are defined at specific positions in the longitudinal direction of the screw 21, in each of the barrel blocks 31b.

For example, if a state in which the raw material conveyed by the first to third flights 110, 111 and 112 (circulating portion 103) is blocked by the barrier portion 102 is assumed, the state "raw material reservoir R" appears at the boundary between the circulating portion 103 and the barrier portion 102. Furthermore, the state called "pressure rise" or "temperature rise" appears at the boundary between the circulating portion 103 and the barrier portion 102 by the increased pressure of the raw material.

Such various states (pressure rise, temperature rise, and raw material reservoir R) appear at constant positions at any time in the longitudinal direction of the screw 21 in each of the "screw elements". Thus, various states (pressure rise, temperature rise, and raw material reservoir R) are, inevitably, defined at specific positions at any time, in the longitudinal direction of the screw 21 of each barrel block 31b in each barrel block 31b in a positional relationship of being opposed to each of "screw elements".

Therefore, variation in pressure and temperature occurring during kneading the raw material can be measured directly in real time, by disposing, for example, the temperature sensor 204 and the pressure sensor 205 at the "specific positions". Then, the temperature of the barrel 20 can be maintained in a state optimum for kneading the raw material, by executing ON/OFF control of the heater 200 and the flow control of the refrigerant to the refrigerant passage 35, based on the measurement results.

The "specific positions" can be preliminarily recognized for each of the barrel block 31b. Therefore, attachment holes (not shown) for attachment of the measurement elements can be preliminarily formed at, for example, the manufacturing stage of the barrel blocks 31b. Various states occurring for each of the screw elements can be thereby measured directly in real time, by only attaching the measurement elements at the "specific positions".

An example of the barrel block 31b in which temperature sensors 204 and pressure sensors 205 are disposed to be opposed to the inlets 117 of the passages 115 and in which heaters 200 and refrigerant passages 35 are disposed to be opposed to the range including the inlets 117 and the outlets 118 of the passages 115, is illustrated in the drawings, but this is merely an example and they can be freely disposed within each of the "screw elements".

In addition, since the advantages and important points resulting from the above-described structure are the same as those of the first embodiment, their explanations are omitted.

Fourth Embodiment

Figure 27:
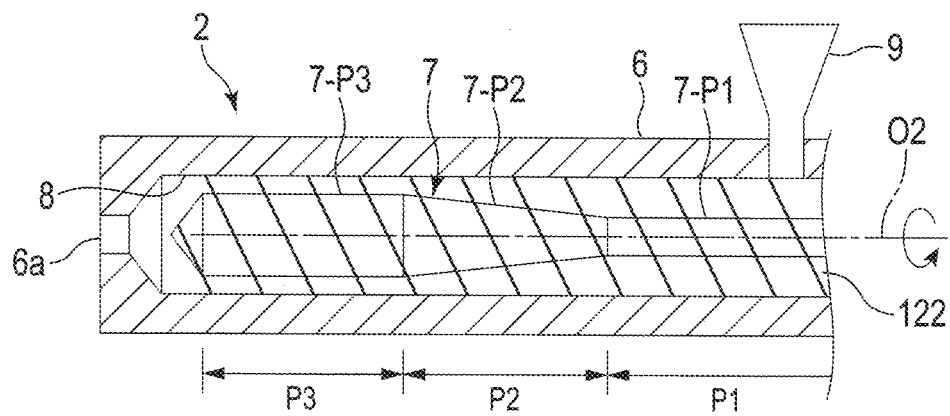
FIG. 27 is a cross-sectional view showing a first extruder according to a fourth embodiment.

FIG. 27 discloses a fourth embodiment. Constituting the first extruder (processor) 2 as the twin-screw kneader has been explained in the first embodiment but, instead, constituting the first extruder 2 as a single-screw extruder is assumed in the fourth embodiment.

As shown in FIG. 27, a barrel 6 comprises a cylinder portion 8 which accommodates a single-axis screw 7 to be rotatable, in the first extruder 2 of the fourth embodiment. The barrel 6 is provided with a feed port 9 which enables, for example, a pelleted material to be fed into the cylinder portion 8, a heater (not shown) which melts the resin, and a discharge port 6a which enables the molten resin to be discharged, similarly to the first embodiment.

The screw 7 is rotatable about an axis O2 and a helically twisted flight 122 is formed on an outer peripheral surface of the screw. The flight 122 is configured to continuously convey the resin fed from the feed port 9 toward the discharge port 6a. For this reason, the flight 122 is twisted in a direction opposite to the direction of rotation of the screw 7 seen from a side of the feed port 9. An example of the flight 122 in a case of rotating the screw 7 counterclockwise and conveying the resin is illustrated in the drawing. That is, the twist direction of the flight 122 is set to be clockwise similarly to a right-hand screw.

Furthermore, a feeding portion P1, a compressing portion P2 and a conveying portion P3 are continuously constituted in order from a side of the feed port 9 to the discharge port 6a, on the outer peripheral surface of the screw 7. The feeding portion P1 has a columnar shape, and a gap between its outer peripheral portion 7-P1 and the cylinder portion 8 is set to be wide. The conveying portion P3 has a columnar shape, and a gap between its outer peripheral portion 7-P3 and the cylinder portion 8 is set to be narrow. In other words, the height of the flight 122 is set to be low by narrowing the gap between the outer peripheral portion 7-P3 and the cylinder portion 8 in the conveying portion P3. Stability of discharge at the discharge port 6a can be therefore increased. The compressing portion P2 is shaped to be expanded from the feeding portion P1 toward the conveying portion P3 and a gap between its outer peripheral portion 7-P2 and the cylinder portion 8 is set to be continuously narrow from the feeding portion P1 toward the conveying portion P3.

The pelleted resin fed from the feed port 9 to the cylinder portion 8 is conveyed from the feeding portion P1 toward the compressing portion P2 and the conveying portion P3 in order by the flight 122 and then discharged from the discharge port 6a, in a state in which the screw 7 is rotated counterclockwise. In the feeding portion P1, the temperature of the resin is low and the resin is solid. In the compressing portion P2, the resin is subjected to compression from a continuously narrowed gap while mainly heated by a heater. In the conveying portion P3, the resin is molten and constitutes the mixed raw material. The raw material discharged from the discharge port 6a of the barrel 6 is continuously fed to the second extruder 3 as represented by arrow A in FIG. 1.

According to the fourth embodiment, even if the first extruder 2 is a single-screw extruder, the raw material having viscosity optimum for kneading in the second extruder 3 can be generated similarly to the twin-screw kneader of the first embodiment. Load on the second extruder 3 can be thereby reduced.

For example, if alternately imparting the shearing action and the extension action to a preliminarily kneaded material, i.e., a pelleted material formed by kneading the resin with a filler (additive) is assumed, the material can be kneaded without deterioration in physical property of the additive or occurrence of cutting of fibers by using the single-screw extruder.

In addition, when the additive is added to the raw material, if the additive is introduced into the first extruder 2 or the second extruder 3, the physical property of the additive may be deteriorated or the additive may be decomposed by high-speed rotation in the second extruder 3. In this case, not only deaeration, but also kneading of the raw material with the additive can be executed by using the twin-screw kneader as the third extruder 4.

Fifth Embodiment

FIG. 28 discloses a fifth embodiment. The fifth embodiment is different from the first embodiment with respect to a structure for imparting an extension action to the raw material. The structure of a screw 21 other than this is the same as that in the first embodiment.

As shown in FIG. 28, a pair of grooves 131a and 131b are formed on an inner peripheral surface of a tubular body 39. The grooves 131a and 131b extend in the axial direction of the screw body 37 and are spaced apart from each other in a diameter direction of the screw body 37. Furthermore, the grooves 131a and 131b are opened to the inner peripheral surface of the tubular body 39.

Opening ends of the grooves 131a and 131b are closed by the outer peripheral surface of a second shaft portion 41 when the tubular body 39 is inserted onto a second shaft portion 41 of a rotary shaft 38. For this reason, the grooves 131a and 131b cooperate with the outer peripheral surface of a second shaft portion 41 to define passages 132 which impart an extension action to a raw material. In the present embodiment, the passages 132 are located at boundary portions between the rotary shaft 38 and the tubular body 39.

In the fifth embodiment, the passages 132 are provided at positions eccentric from the axis O1 of the rotary shaft 38, inside the screw body 37. Therefore, the passages 132 are displaced from the axis O1 and revolve about the axis O1 when the screw body 37 is rotated, similarly to the first embodiment.

In the fifth embodiment, the passages 132 are formed inside the screw body 37 when the tubular body 39 is inserted on the second shaft portion 41 of the rotary shaft 38. Since the grooves 131a and 131b defining the passages 132 are opened to the inner peripheral surface of the tubular body 39, work of forming the grooves 131a and 131b can easily be executed.

Therefore, for example, when a cross-sectional shape of the passages 132 needs to be changed, too, response can easily be made.

Sixth Embodiment

FIG. 29 discloses a sixth embodiment. The sixth embodiment is different from the fifth embodiment with respect to a structure for imparting an extension action to the raw material. The structure of a screw 21 other than this is the same as that in the fifth embodiment.

As shown in FIG. 29, a pair of grooves 141a and 141b are attached on an outer peripheral surface of a second shaft portion 41 of a rotary shaft 38. The grooves 141a and 141b extend in the axial direction of a second shaft portion 41 and are spaced apart from each other in a diameter direction of the second shaft portion 41. Furthermore, the grooves 141a and 141b are opened to the outer peripheral surface of the second shaft portion 41.

Opening ends of the grooves 141a and 141b are closed by the inner peripheral surface of a tubular body 39 when the tubular body 39 is inserted onto the second shaft portion 41 of the rotary shaft 38. For this reason, the grooves 141a and 141b cooperate with the inner peripheral surface of the tubular body 39 to define passages 142 which impart an extension action to the raw material. In the present embodiment, the passages 142 are located at boundary portions between the rotary shaft 38 and the tubular body 39.

In the sixth embodiment, the passages 142 are provided at positions eccentric from the axis O1 of the rotary shaft 38, inside the screw body 37. Therefore, the passages 142 are displaced from the axis O1 and revolve about the axis O1 when the screw body 37 is rotated, similarly to the fifth embodiment.

In the sixth embodiment, the passages 142 are formed inside the screw body 37 when the tubular body 39 is inserted on the second shaft portion 41 of the rotary shaft 38. Since the grooves 141a and 141b defining the passages 142 are opened to the outer peripheral surface of the rotary shaft 38, work of forming the grooves 141a and 141b can easily be executed.

Therefore, for example, when a cross-sectional shape of the passages 142 needs to be changed, too, response can easily be made.

Seventh Embodiment

Figure 30:
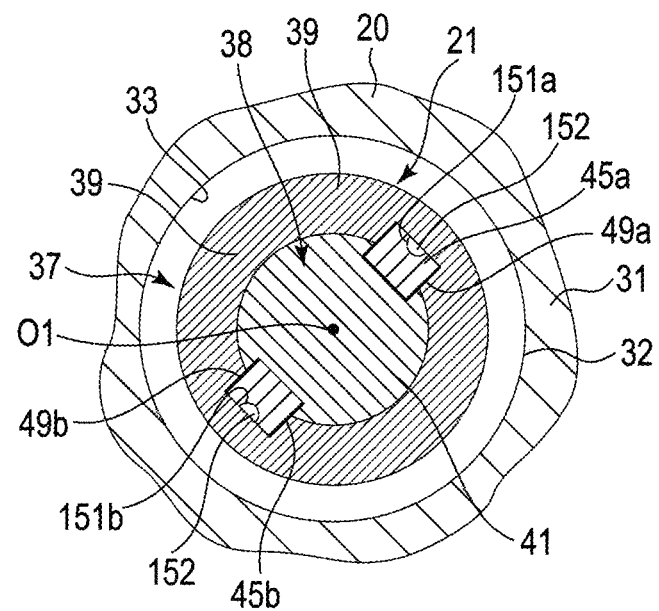
FIG. 30 is a cross-sectional view showing a second extruder according to a seventh embodiment.

FIG. 30 discloses a seventh embodiment. The seventh embodiment is different from the first embodiment with respect to a structure for imparting an extension action to the raw material. The structure of a screw 21 other than this is the same as that in the first embodiment.

As shown in FIG. 30, recess portions 151a and 151b are formed on tip surfaces of keys 45a and 45b protruding from an outer peripheral surface of a second shaft portion 41. The recess portions 151a and 151b extend in an axial direction of the second shaft portion 41 and are opened to the tip surfaces of keys 45a and 45b. When the keys 45a and 45b are fit in keyways 49a and 49b of a tubular body 39, open ends of the recess portions 151a and 151b are closed by inner peripheral surfaces of the keyways 49a and 49b.

For this reason, the recess portions 151a and 151b cooperate with the inner peripheral surfaces of the keyways 49a and 49b to define passages 142 which impart an extension action to the raw material. In the present embodiment, the passages 152 are located at boundary portions between the keys 45a and 45b and the tubular body 39.

According to the seventh embodiment, the passages 152 are provided at positions eccentric from the axis O1 of the rotary shaft 38, inside the screw body 37. Therefore, the passages 152 are displaced from the axis O1 and revolve about the axis O1 when the screw body 37 is rotated, similarly to the first embodiment.

In the seventh embodiment, when the keys 45a and 45b of the rotary shaft 38 are fit in the keyways 49a and 49b of the tubular body 39, the passages 152 are formed in the screw body 37. Since the recess portions 151a and 151b defining the passages 152 are opened to the tip surfaces of the keys 45a and 45b, work of forming the recess portions 151a and 151b can easily be executed.

Therefore, for example, when a cross-sectional shape of the passages 152 needs to be changed, too, response can easily be made.

In the seventh embodiment, other recess portions extending in the axial direction of the second shaft portion 41 may be provided on the inner peripheral surfaces of the keyways 49a and 49b and the passages 152 may be defined by urging the other recess portions to match the recess portions 151a and 151b.

Eighth Embodiment

Figure 31:
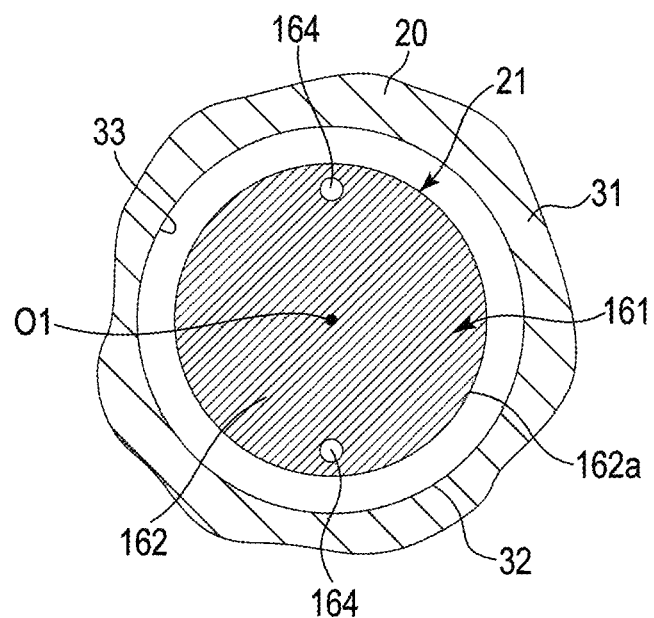
FIG. 31 is a cross-sectional view showing a second extruder according to an eighth embodiment.

FIG. 31 discloses an eighth embodiment. The eighth embodiment is different from the first embodiment with respect to a structure of a screw 21 and a structure for imparting an extension action to the raw material.

As shown in FIG. 31, the screw 21 comprises a solid screw body 161. The screw body 161 is composed of a straight shaft-like member 162. The shaft-like member 162 has an axis O1 which coaxially penetrates a central portion of the member and is coaxially accommodated in a cylinder portion 33 of a barrel 20.

Furthermore, the shaft-like member 162 has an outer peripheral surface 162a which is continuous in a circumferential direction and the outer peripheral surface 162a faces an inner peripheral surface of the cylinder portion 33 of a barrel 20. A flight (not shown) which conveys the raw material is formed on the outer peripheral surface 162a of the shaft-like member 162.

Moreover, a pair of passages 164 which impart an extension action to the raw material are formed inside the shaft-like member 162. The passages 164 extend in an axial direction of the shaft-like member 162 and are arranged parallel to each other to sandwich the axis O1. For this reason, the passages 164 are provided at positions eccentric from the axis O1 of the shaft-like member 162, inside the screw body 161. Therefore, the passages 164 are displaced from the axis O1 and revolve about the axis O1 when the screw body 161 is rotated, similarly to the first embodiment.

The passages 164 which impart the extension action to the raw material can be formed in the screw body 161 even when the screw body 161 is composed of the shaft-like member 162. For this reason, the screw body is not limited to a structure combining the rotary shaft and the tubular body.

Other Embodiments

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the invention.

For example, the passage which imparts the extension action to the raw material is not limited to the hole having the circular cross-section. The passage may be composed of, for example, a hole having an elliptic or polygonal cross-section, and the cross-section of the passage is not restricted particularly.

In addition, the example that the screw 21 is rotated counterclockwise when the screw body is seen from the direction of the proximal end of the rotary shaft 38 has been explained in each of the embodiments, but the invention is not restricted to this. For example, the screw 21 may be rotated clockwise as seen from the side of the proximal end of the screw 21.

In this case, for example, in the first embodiment, the flight 56 which the conveying portion 54 of the screw 21 comprises may be twisted clockwise similarly to the right-hand screw so as to convey the raw material from the distal end to the proximal end of the screw body 37. Similarly, the flight 57 which the barrier portion 55 comprises may be twisted counterclockwise so as to convey the raw material from the proximal end to the distal end of the screw body 37.

Moreover, the barrier portion of the screw body is not restricted by the constituent feature that the barrier portion is composed of the helically twisted flight. For example, the barrier portion may be configured to comprise an annular large-diameter portion having an outer peripheral surface which is continuous in the circumferential direction of the screw body. The large-diameter portion desirably has a width in the axial direction of the screw body and has a smooth annular shape having no recesses, notches or the like on its outer peripheral surface.

In addition, the third extruder 4 which removes the gaseous components included in the kneaded material extruded from the second extruder 3 is not limited to the single-screw extruder but a twin-screw extruder may be employed as the third extruder.

If the third extruder 4 is configured as the twin-screw extruder, two vent screws 23 shown in FIG. 4 may be arranged and their flights 29 may be engaged with each other in a state in which their phases are displaced at 90 degrees. Since surface renewal of the kneaded material can be promoted by rotating two screws 23 in the same direction, the efficiency of suction and removal of the gaseous components contained in the kneaded material can be increased. The kneaded material from which the gaseous substances have been sucked and removed is continuously discharged to the outside of the high shear processing apparatus 1 through the discharge port 28 of the head portion 27.

The continuous high shear processing apparatus of the invention needs only to comprise at least the first extruder which preliminarily kneads the raw material and the second extruder which completely kneads the raw material, and may not comprise the third extruder which removes the gaseous substances and the volatile components. If the apparatus does not comprise the third extruder, at least vent port may be provided at a middle portion of the second extruder to remove the gaseous substances and the volatile components from the raw material in the kneading process.

Furthermore, the first extruder (processor) 2 is not limited to the twin-screw kneader (FIG. 2 and FIG. 3) or the single-screw extruder (FIG. 27) but, for example, various kneaders such as a multi-screw extruder, a Banbury mixer, a kneader, and an open roll can be employed as the first extruder.

REFERENCE SIGNS LIST

2 . . . first extruder (processor), 3 . . . second extruder, 4 . . . third extruder (defoamer), 20 . . . barrel, 21 . . . screw, 31a, 31b, 31c . . . barrel block, 33 . . . cylinder portion, 34 . . . feed port, 36a . . . discharge port, 37, 161 . . . screw body, 54, 81, 101 . . . conveying portion, 60, 88, 115, 132, 142, 152, 164 . . . passage, O1, O2 . . . axis.

What is claimed is:

1. An extruder comprising:
an extruder screw for kneading a raw material, the extruder screw comprising:
a screw body which has a straight axis along a direction of conveyance of the raw material and which is configured to rotate about the straight axis; and
a screw element provided in the screw body, the screw element comprising:
a conveying portion configured to convey the raw material in an axial direction along an outer peripheral surface of the screw body extending in a circumferential direction of the screw body, in accordance with rotation of the screw body,
a passage provided inside the screw body, the passage comprising an inlet opened in the outer peripheral surface of the screw body in the conveying portion and an outlet opened in the outer peripheral surface of the screw and located away from the inlet in the axial direction, into which the raw material conveyed by the conveying portion flows, and in which the raw material flows in the axial direction of the screw body, and
a barrier portion which forms a raw material reservoir by restricting conveyance of the raw material conveyed by the conveying portion and urges the pressurized raw material to flow into the passage from the inlet, wherein
the conveying portion and the barrier portion are arranged in order and in combination, the conveying portion and the barrier portion have a constant length along the screw body, and a plurality of the combinations of the conveying portion and the barrier portion are provided at regular intervals; and
a barrel comprising:
a cylinder portion in which the extruder screw is inserted so as to be rotatable, and
a blocked barrel block wherein a plurality of barrel blocks are combined and integrated, wherein a length of at least one barrel block of the plurality of barrel blocks is set to be equal to a length of the screw element along the axial direction of the screw body, or set to an integral multiple of the length of the screw element along the axial direction of the screw body or a fraction of an integer of the length of the screw element along the axial direction of the screw body, and attachment holes for attaching a temperature sensor and a pressure sensor which measure temperature variation and pressure variation of the raw material reservoir occurring at regular intervals in the axial direction of the screw body are provided at corresponding positions of the blocked barrel block.

2. The extruder of claim 1, wherein
when a plurality of the screw elements are regularly arranged in a longitudinal direction of the extruder screw, a length of the barrel can be varied by combining the plurality of barrel blocks based on number of the arranged screw elements.

* * * * *